(12) United States Patent
Huh et al.

(10) Patent No.: US 10,423,046 B2
(45) Date of Patent: Sep. 24, 2019

(54) LIQUID CRYSTAL LENS AND DISPLAY DEVICE INCLUDING THE SAME

(71) Applicant: SAMSUNG DISPLAY CO., LTD., Yongin-si, Gyeonggi-Do (KR)

(72) Inventors: Su Jung Huh, Yongin-si (KR); Beom Shik Kim, Yongin-si (KR); Jun Ho Song, Seongnam-si (KR); Yeon Mun Jeon, Hwaseong-si (KR); In Sun Hwang, Suwon-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 42 days.

(21) Appl. No.: 15/454,413

(22) Filed: Mar. 9, 2017

(65) Prior Publication Data

US 2017/0277012 A1 Sep. 28, 2017

(30) Foreign Application Priority Data

Mar. 25, 2016 (KR) .................. 10-2016-0036025

(51) Int. Cl.
*G02F 1/29* (2006.01)
*G02B 27/22* (2018.01)
*G02F 1/1333* (2006.01)

(52) U.S. Cl.
CPC .............. *G02F 1/29* (2013.01); *G02B 27/225* (2013.01); *G02B 27/2214* (2013.01); *G02F 1/1333* (2013.01); *G02F 2001/294* (2013.01); *G02F 2201/122* (2013.01)

(58) Field of Classification Search
None
See application file for complete search history.

(56) References Cited

U.S. PATENT DOCUMENTS

| | | | |
|---|---|---|---|
| 6,212,007 B1 | 4/2001 | Hentschke | |
| 8,786,812 B2 | 7/2014 | Miyazawa et al. | |
| 9,019,449 B2 | 4/2015 | Baek et al. | |
| 9,488,845 B2 | 11/2016 | Oka et al. | |
| 2008/0252720 A1* | 10/2008 | Kim | H04N 13/305 348/59 |
| 2011/0109824 A1* | 5/2011 | Galstian | C09K 19/02 349/33 |
| 2011/0216257 A1* | 9/2011 | Galstian | C08J 3/28 349/33 |
| 2013/0050595 A1* | 2/2013 | Kang | G02F 1/133371 349/15 |
| 2013/0241964 A1* | 9/2013 | Ohyama | G09G 3/003 345/690 |

(Continued)

FOREIGN PATENT DOCUMENTS

| | | |
|---|---|---|
| JP | 2013003588 | 1/2013 |
| JP | 2015018282 | 1/2015 |
| JP | 2015102808 | 6/2015 |

*Primary Examiner* — Ryan Crockett
(74) *Attorney, Agent, or Firm* — F. Chau & Associates, LLC

(57) ABSTRACT

A liquid crystal lens includes first and second electrodes facing each other, and a liquid crystal layer interposed between the first and second electrodes. The first electrode includes at least one unit pattern. The unit pattern includes a pattern electrode and an aperture. The pattern electrode is disposed adjacent to a boundary of the unit pattern and the aperture is disposed inside the pattern electrode.

20 Claims, 27 Drawing Sheets

(56) References Cited

U.S. PATENT DOCUMENTS

| | | | | |
|---|---|---|---|---|
| 2014/0028924 A1* | 1/2014 | Yamaguchi | .............. | G02F 1/29 |
| | | | | 349/1 |
| 2014/0028932 A1* | 1/2014 | Kuo | ................. | G02F 1/133526 |
| | | | | 349/15 |
| 2014/0118646 A1* | 5/2014 | Jeon | ...................... | G02B 1/041 |
| | | | | 349/15 |
| 2014/0240475 A1* | 8/2014 | Shigemura | ......... | H04N 13/0406 |
| | | | | 348/59 |
| 2014/0292732 A1* | 10/2014 | Niioka | ................... | G02B 27/22 |
| | | | | 345/204 |
| 2015/0070607 A1* | 3/2015 | Usukura | ............. | G02B 3/0081 |
| | | | | 349/15 |
| 2015/0116613 A1* | 4/2015 | Kasano | ..................... | G02F 1/29 |
| | | | | 349/15 |
| 2015/0370125 A1* | 12/2015 | Yonemura | ................ | G02F 1/29 |
| | | | | 349/200 |
| 2016/0097948 A1* | 4/2016 | Chin | ........................ | G02B 3/14 |
| | | | | 349/33 |
| 2016/0223817 A1* | 8/2016 | Kizu | ................. | G02B 27/0172 |
| 2016/0341971 A1* | 11/2016 | Chen | .................... | G02F 1/1335 |
| 2018/0124384 A1* | 5/2018 | Huh | ................... | H04N 13/0404 |

* cited by examiner

LIQUID CRYSTAL LENS AND DISPLAY DEVICE INCLUDING THE SAME

This application claims priority under 35 U.S.C. § 119 to Korean Patent Application No. 10-2016-0036025, filed on Mar. 25, 2016, in the Korean Intellectual Property Office, the disclosure of which is incorporated by reference herein in its entirety.

TECHNICAL FIELD

The present invention relates to a liquid crystal lens and a display device including the liquid crystal lens, and more particularly, to a liquid crystal lens capable of controlling the path of light and a display device including the liquid crystal lens.

DISCUSSION OF THE RELATED ART

Display devices may emit light in various ways to display images. The display devices may be classified according to the way in which they emit light. Research has been conducted on ways to control the luminance of light emitted by the display devices and to increase the display quality of the display devices.

Stereoscopic three-dimensional (3D) display devices realize a stereoscopic 3D image by controlling the path of light. Stereoscopic 3D displays work by displaying a first image to the left eye and a second image to the right eye, which a user perceives as a single 3D stereoscopic image. Various stereoscopic 3D display techniques such as a polarization method, a time-division method, a parallax-barrier method, a lenticular or micro-lens method and a blinking light method have been studied.

When 3D video content is provided, the 3D video content can be displayed as a 3D image. However, two-dimensional (2D) video content is displayed as a 2D image because it cannot be displayed as a 3D image.

SUMMARY

According to an exemplary embodiment of the present invention, a liquid crystal lens includes first and second electrodes facing each other, and a liquid crystal layer interposed between the first and second electrodes. The first electrode includes at least one unit pattern. The unit pattern includes a pattern electrode and an aperture. The pattern electrode is disposed adjacent to a boundary of the unit pattern and the aperture is disposed inside the pattern electrode.

According to an exemplary embodiment of the present invention, a display device includes an apparatus for providing light, and a liquid crystal lens disposed on the apparatus. The liquid crystal lens includes first and second electrodes facing each other, and a liquid crystal layer interposed between the first and second electrodes. The first electrode includes at least one unit pattern, and the at least one unit pattern includes a pattern electrode, which is disposed adjacent to a periphery of the at least one unit pattern, and an opening in the pattern electrode.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION OF THE EMBODIMENTS

Figure 1:
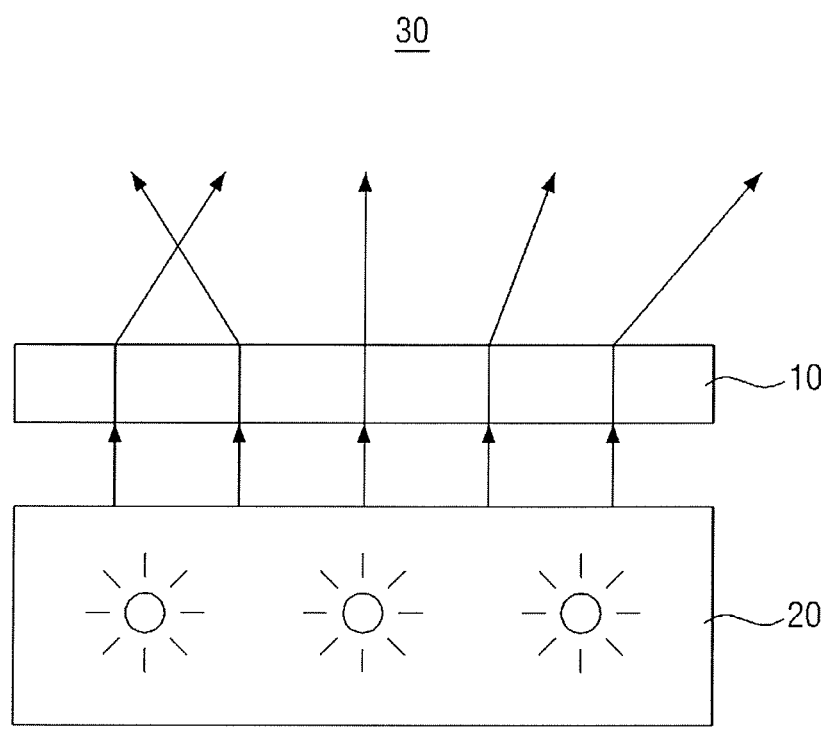
FIG. 1 is a diagram illustrating a display device according to an exemplary embodiment of the present invention.

Exemplary embodiments of the present invention will be described more fully hereinafter with reference to accompanying drawings. The present invention may, however, be embodied in different forms and should not be construed as limited to the embodiments set forth herein. Like reference numerals may refer to like elements throughout the specification. The sizes or proportions of elements illustrated in the drawings may be exaggerated for clarity.

As used herein, the singular forms "a," "an," and "the" may include the plural form as well, unless the context clearly indicates otherwise.

FIG. 1 is a diagram illustrating a display device according to an exemplary embodiment of the present invention.

Referring to FIG. 1, a display device 30 includes an apparatus 20 for providing light and a liquid crystal lens 10, which is disposed at a side of the apparatus 20.

The apparatus 20 provides light to the liquid crystal lens 10. The light provided by the apparatus 20 may include light emitted from the apparatus 20 and/or light incident from the liquid crystal lens 10 and reflected from the apparatus 20.

The apparatus 20 may include a display panel. In an exemplary embodiment of the present invention, the display panel may be a self-emissive display panel such as an organic light-emitting diode (OLED) display panel, a light-emitting diode (LED) display panel, an inorganic electro-luminescent (EL) display panel, a field emission display (FED) panel, a surface-conduction electron-emitter display (SED) panel, a plasma display panel (PDP) or a cathode ray tube (CRT) display panel. In an exemplary embodiment of the present invention, the display panel may be a non-self-emissive display panel such as a liquid crystal display (LCD) panel or an electrophoretic display (EPD) panel. When the display panel is a non-self-emissive display panel, the apparatus 20 may further include a light source such as a backlight assembly.

The liquid crystal lens 10 is disposed at a side of the apparatus 20 and receives light emitted from the apparatus 20. The liquid crystal lens 10 modulates at least some of the properties of light incident thereon, such as the path and the phase of the incident light. For example, in a first mode (e.g., a first operating mode), the liquid crystal lens 10 may not modulate the properties of light, but in a second mode (e.g., a second operating mode), the liquid crystal lens 10 may modulate the properties of light. By having the optical modulation characteristics of the liquid crystal lens 10 vary from one mode to another mode, an image emitted from the display panel of the apparatus 20 may be modulated differently from one mode to another mode. As a result, an image emitted via the liquid crystal lens 10 may be controlled differently from one mode to another mode. Since the optical modulation characteristics of the liquid crystal lens 10 may vary from one mode to another mode, the display device 30 may be set to display a two-dimensional (2D) image or a three-dimensional (3D) image.

Exemplary embodiments of the liquid crystal lens 10 will hereinafter be described in further detail.

Figure 2:
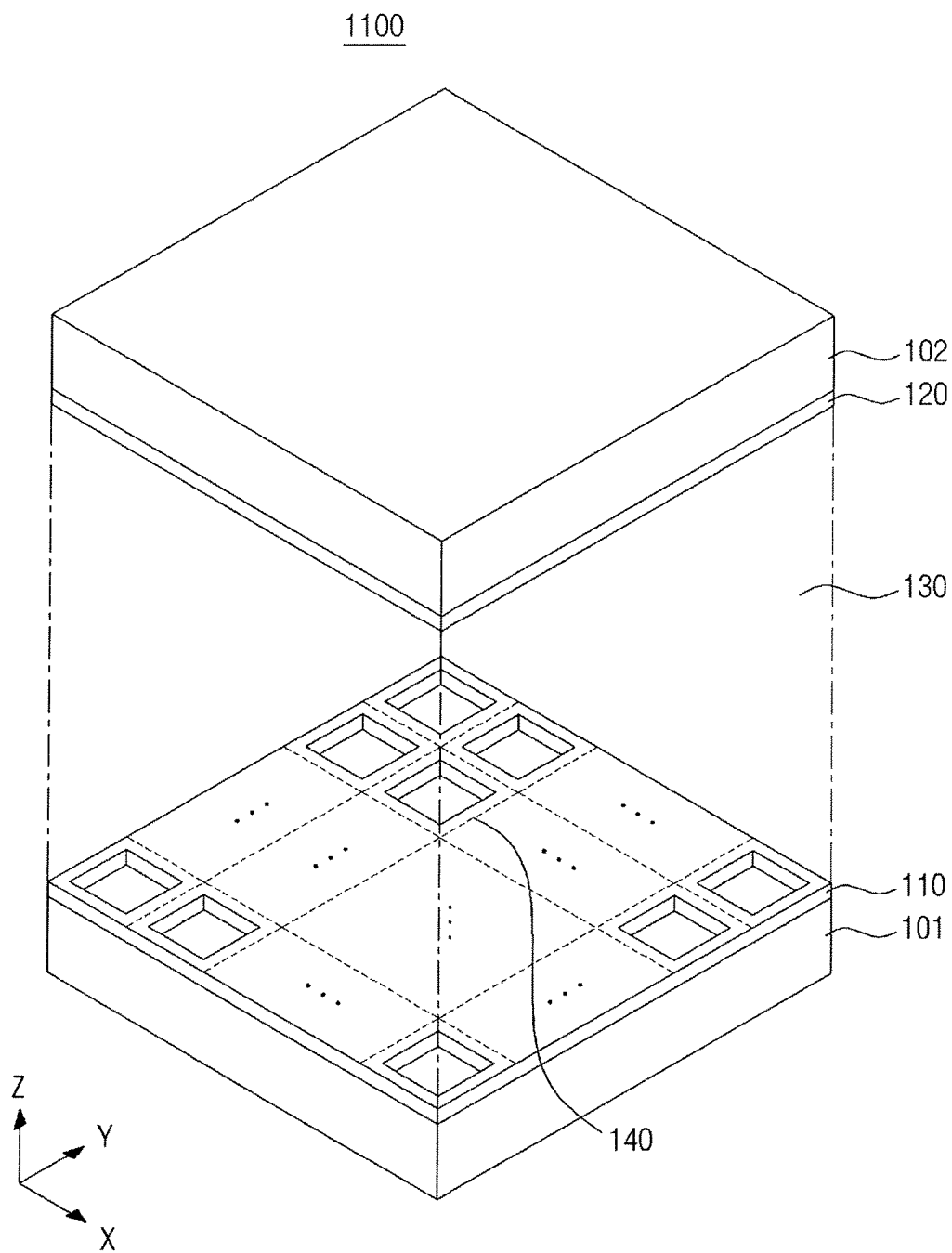
FIG. 2 is a perspective view illustrating a liquid crystal lens according to an exemplary embodiment of the present invention.

FIG. 2 is a perspective view illustrating a liquid crystal lens according to an exemplary embodiment of the present invention.

Referring to FIG. 2, first, second and third directions X, Y and Z may be perpendicular to one another. A plan view may refer to a plane formed in the first and second directions X and Y throughout the specification. A cross-sectional view may refer to a cross-section taken along the XY plane.

A liquid crystal lens 1100 includes first and second electrodes 110 and 120, which are opposite to each other, and a liquid crystal layer 130, which is interposed between the first and second electrodes 110 and 120.

The first electrode 110 may be formed on a first substrate 101. The second electrode 120 may be formed on a second substrate 102. The first and second substrates 101 and 102 may be transparent substrates. For example, the first and second substrates 101 and 102 may be transparent plastic substrates, transparent glass substrates, transparent quartz substrates, or the like. In an exemplary embodiment of the present invention, at least one of the first and second substrates 101 and 102 may be flexible. In an exemplary embodiment of the present invention, at least one of the first and second substrates 101 and 102 may not be provided. For example, when the liquid crystal lens 1100 and the apparatus 20 are formed in one integral body (e.g., one continuous structure), a surface of the apparatus 20 may perform the functions of the first or second substrate 101 or 102.

The first and second electrodes 110 and 120 may include a transparent conductive material. For example, the first and second electrodes 110 and 120 may include an oxide such as indium tin oxide (ITO), indium zinc oxide (IZO), zinc oxide (ZO), indium oxide (JO), and/or titanium oxide (TiO). In an exemplary embodiment of the present invention, the first and second electrodes 110 and 120 may include a material such as carbon nanotubes (CNTs), metal nanowires, or a conductive polymer. In addition, the first electrode 110 may include a material different from the material(s) included in the second electrode 120.

The first electrode 110 receives a first voltage, and the second electrode 120 receives a second voltage. Thus, an electric field corresponding to the difference between the first and second voltages may be formed between the first and second electrodes 110 and 120.

In an exemplary embodiment of the present invention, at least one of the first and second electrodes 110 and 120 may be a patterned electrode. Due to the patterned electrode, the electric field formed between the first and second electrodes 110 and 120 may be oriented in a direction other than the third direction Z. Accordingly, liquid crystal molecules 131 (see FIG. 5) of the liquid crystal layer 130 may be oriented in different directions in different areas of the first and second electrodes 110 and 120.

The first and second electrodes 110 and 120 may be disposed to be parallel to each other.

Figure 4:
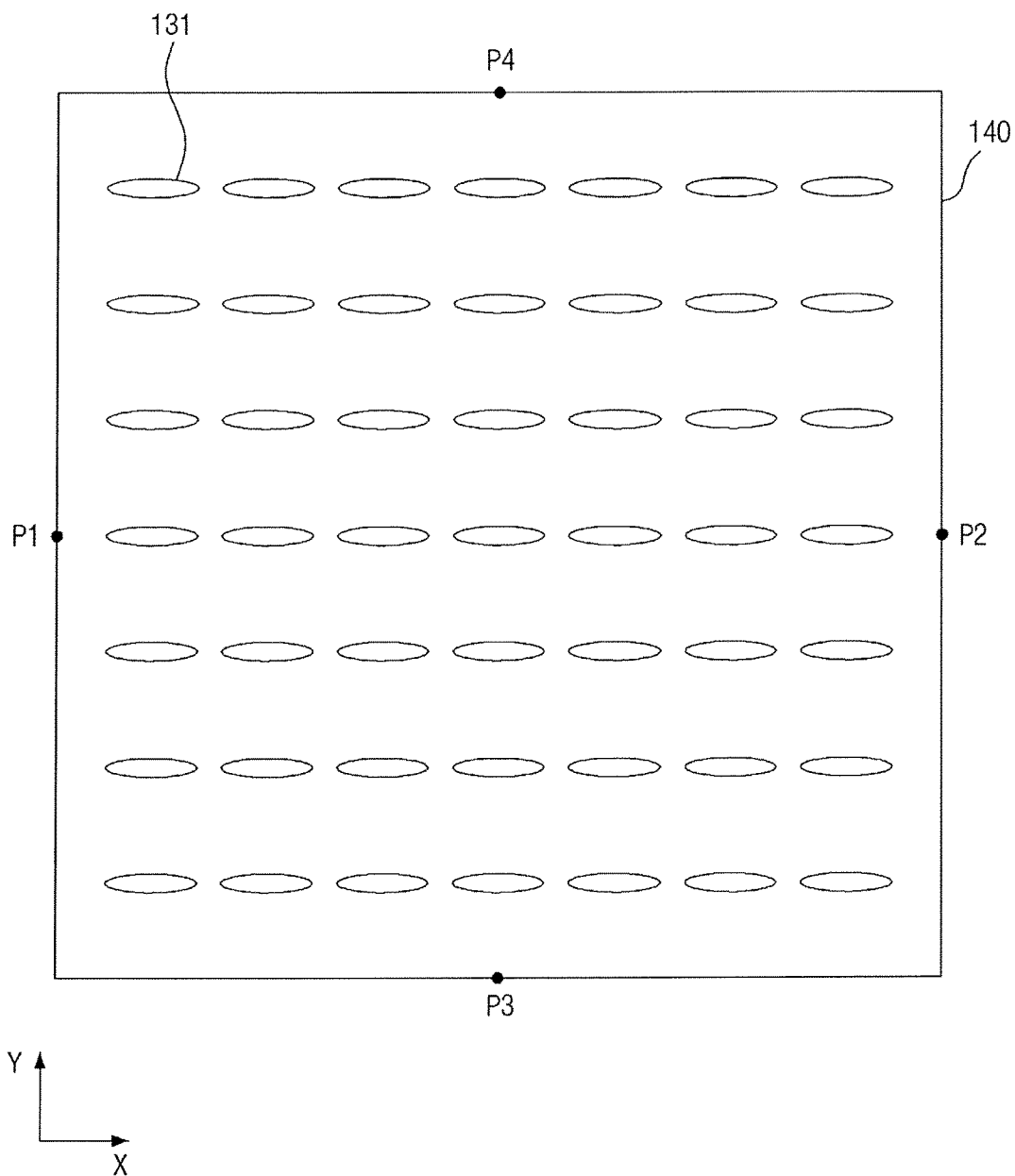
FIG. 4 is a plan view illustrating the liquid crystal lens of FIG. 3 in a first mode according to an exemplary embodiment of the present invention.

The liquid crystal layer 130 is interposed between the first and second electrodes 110 and 120. The liquid crystal layer 130 includes the liquid crystal molecules 131. The liquid crystal molecules 131 may be uniformly distributed throughout the entire liquid crystal layer 130. In an exemplary embodiment of the present invention, the liquid crystal molecules 131 have positive dielectric anisotropy and are initially aligned in a horizontal direction. The expression "initially aligned in the horizontal direction," as used herein, may denote a state in which the long axes of the liquid crystal molecules 131 are aligned in parallel to the first or second direction X or Y. In an exemplary embodiment of the present invention, the liquid crystal molecules 131 may be initially aligned in the first direction X, as illustrated in FIG. 4.

In an exemplary embodiment of the present invention, the liquid crystal molecules 131 may have negative dielectric anisotropy. In this case, the liquid crystal molecules 131 may be initially aligned in a vertical direction. The expression "initially aligned in the vertical direction," as used herein, may denote a state in which the long axes of the liquid crystal molecules 131 are aligned substantially parallel to the third direction Z.

A first alignment layer, which initially aligns the liquid crystal molecules 131 in the liquid crystal layer 130, may be disposed on the first electrode 110. A second alignment layer, which initially aligns the liquid crystal molecules 131 in the liquid crystal layer 130, may be disposed on, e.g., below, the second electrode 120.

A first planarization layer may be disposed on the first electrode 110 or on the first alignment layer. The first planarization layer may prevent the liquid crystal molecules 131 from being misaligned by any height differences on the first electrode 110. A second planarization layer may be disposed on, e.g., below, the second electrode 120 or on, e.g., below, the second alignment layer. The second planarization layer may planarize any height differences formed on the second electrode 120. If there are no height differences on the second electrode 120, the second planarization layer may not be provided.

A polarizer may be disposed below the first substrate 100 to impart particular polarization properties to light incident upon the liquid crystal lens 1100. The light incident upon the liquid crystal lens 1100 can be controlled as needed when it includes components polarized in a particular direction. For example, in an exemplary embodiment of the present invention, the light incident upon the liquid crystal lens 1100 is linearly polarized. The polarizer may be used to polarize the light incident upon the liquid crystal lens 1100. If the light provided by the apparatus 20 is already polarized in the particular direction, the polarizer may not be provided. In an exemplary embodiment of the present invention, the light provided by the apparatus 20 may already be polarized in the first direction X, or may be polarized in the first direction X later by the polarizer.

The first electrode 110 includes one or more unit patterns 140. The unit patterns 140 may have substantially the same shape. The unit patterns 140 may be arranged in a matrix of rows and columns.

Each pair of adjacent unit patterns 140 may be formed in one integral body (e.g., in one continuous structure). For example, when transparent conductive electrodes are provided on both sides of a border where their respective unit patterns 140 adjoin each other, the transparent conductive electrodes may be formed in one integral body without being separated. A plurality of unit patterns 140 may be grouped together to form the first electrode 110.

The unit patterns 140 will be described in further detail hereinafter.

Figure 3:
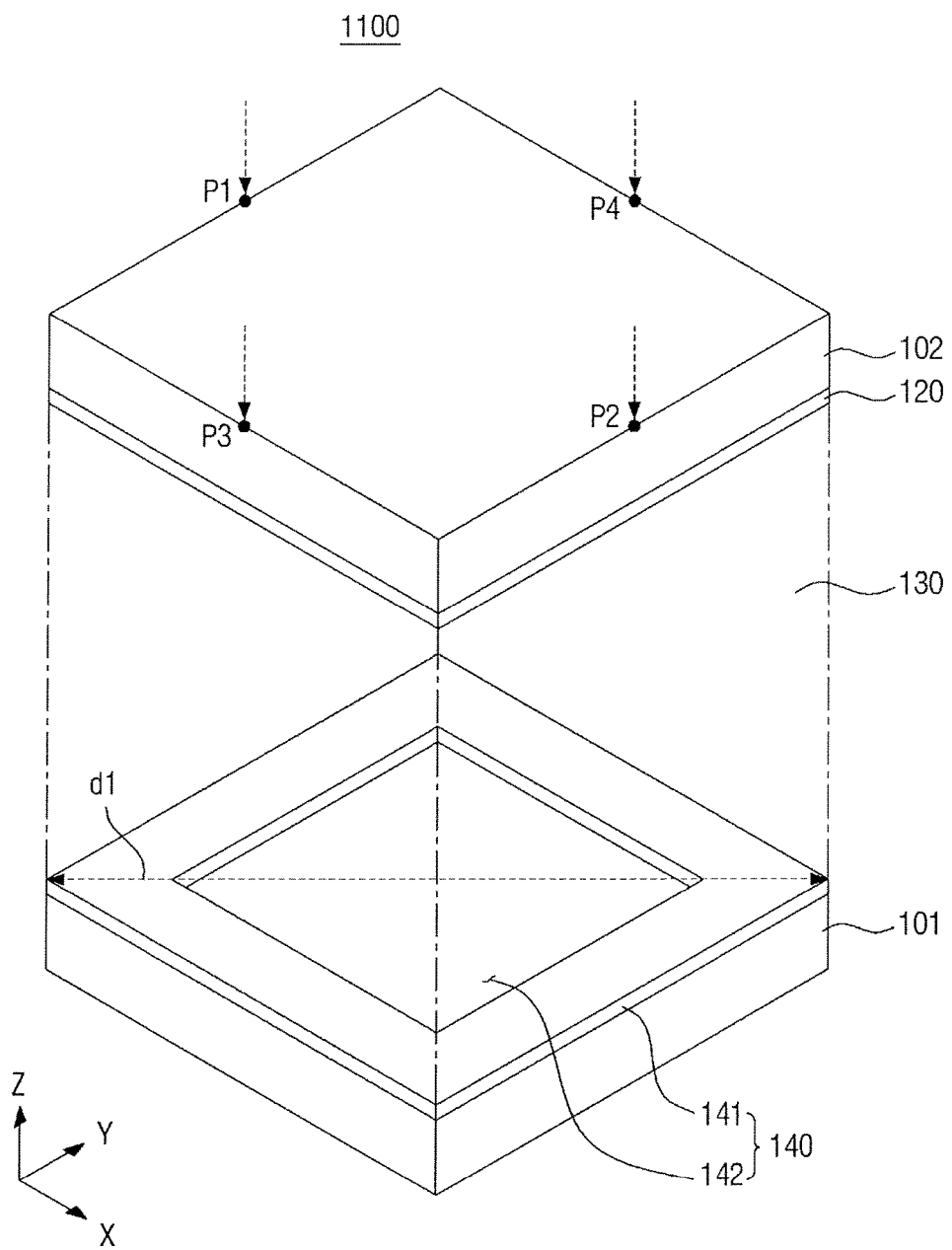
FIG. 3 is a perspective view illustrating a unit pattern of the liquid crystal lens of FIG. 2 according to an exemplary embodiment of the present invention.

FIG. 3 is a perspective view illustrating a unit pattern of the liquid crystal lens of FIG. 2 according to an exemplary embodiment of the present invention.

Referring to FIG. 3, a unit pattern 140 includes a pattern electrode 141, which is disposed at the sides of the unit pattern 140, and an aperture 142, which is disposed on the inside of the pattern electrode 141.

The pattern electrode 141 may include a transparent conductive material and may form the first electrode 110 together with other pattern electrodes 141. The pattern electrode 141 may be formed to extend inwardly from the sides of the unit pattern 140, and thus, to have a predetermined width. The aperture 142 may not contact the sides of the unit pattern 140.

In an exemplary embodiment of the present invention, the unit pattern 140 may have a square shape, and the sides of the unit pattern 140 may form a square shape. However, the present invention is not limited thereto. For example, the unit pattern 140 may have a quadrangular or other polygonal shape, and the sides of the unit pattern 140 may form the same shape as the unit pattern 140.

The aperture 142, which is a through hole where no transparent conductive material is disposed, exposes the top surface of the first substrate 101 below the first electrode 110. For example, the aperture 142 may be a hole in the first electrode 110.

The aperture 142 may be disposed at the center of the unit pattern 140. The aperture 142 may be surrounded by the pattern electrode 141. Accordingly, a pair of adjacent apertures 142, disposed in a pair of adjacent unit patterns 140, may be isolated from each other.

In an exemplary embodiment of the present invention, the aperture 142 has a square shape, but the present invention is not limited thereto. For example, the shape of the aperture 142 may be set without regard to the shape formed by the sides of the unit pattern 140. For an increased viewing angle of the liquid crystal lens 1100, the aperture 142 may be formed to be symmetrical with respect to the central point of the unit pattern 140.

To make the path of light gradually change, the long axis of the unit pattern 140 may have a length of 200 μm or less, which will be described below with reference to FIGS. 12 and 13.

The change of the alignment of the liquid crystal molecules 131 and the change of the path of light, according to the difference between the first and second voltages, will be described hereinafter with reference to a single unit pattern 140.

Figure 5:
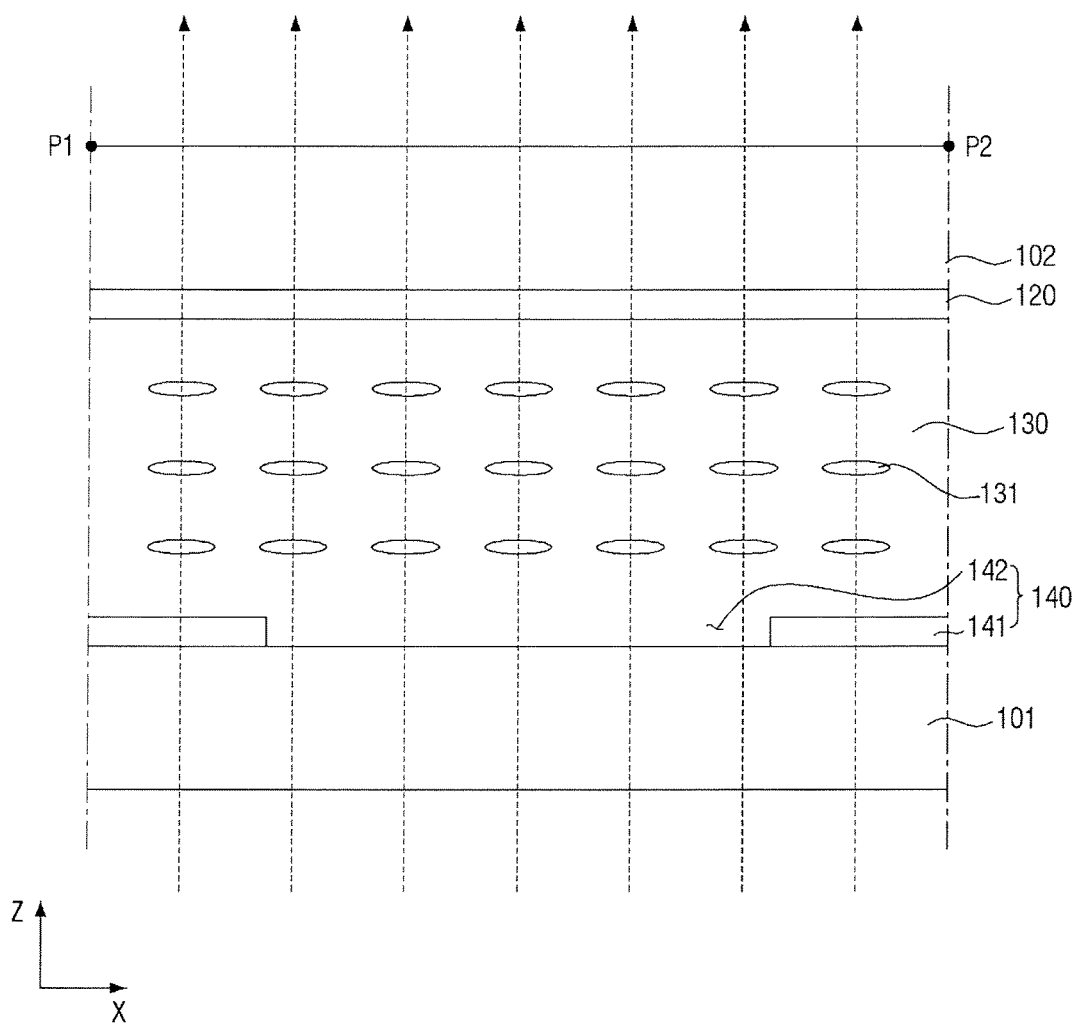
FIG. 5 is a cross-sectional view taken along a line that extends in the first direction X, illustrating the liquid crystal lens of FIG. 3 in the first mode, according to an exemplary embodiment of the present invention.
Figure 6:
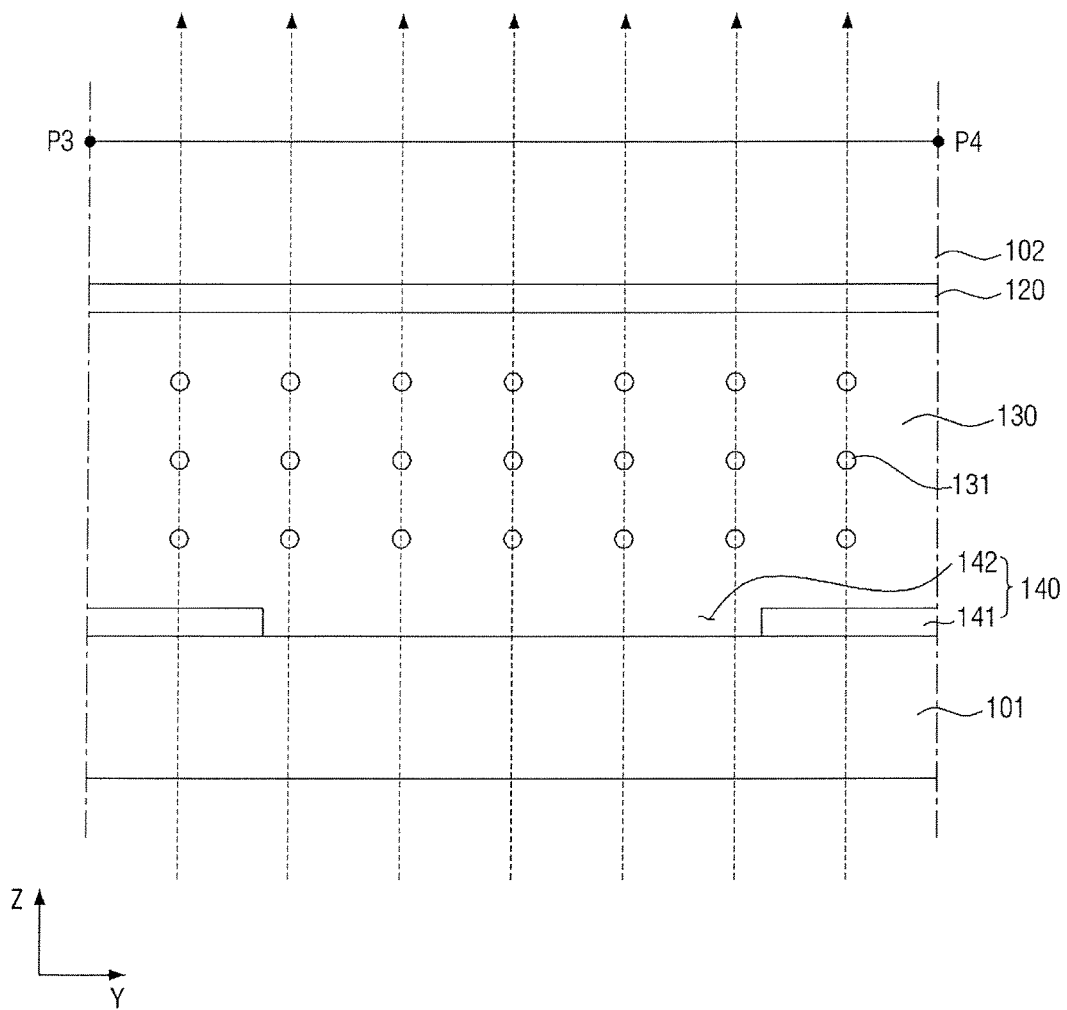
FIG. 6 is a cross-sectional view taken along a line that extends in the second direction Y, illustrating the liquid crystal lens of FIG. 3 in the first mode, according to an exemplary embodiment of the present invention.

FIG. 4 is a plan view illustrating the liquid crystal lens of FIG. 3 in a first mode according to an exemplary embodiment of the present invention. FIG. 5 is a cross-sectional view taken along a line that extends in the first direction X, illustrating the liquid crystal lens of FIG. 3 in the first mode, according to an exemplary embodiment of the present invention. FIG. 6 is a cross-sectional view taken along a line that extends in the second direction Y, illustrating the liquid crystal lens of FIG. 3 in the first mode, according to an exemplary embodiment of the present invention.

The first mode is a mode of operation in which the first and second voltages provided to the first and second electrodes 110 and 120 are identical. For example, the first mode is a mode in which the difference between the first and second voltages is zero.

For example, FIG. 5 is a cross-section of the liquid crystal lens 1100, taken along a line that extends from a first point P1 to a second point P2. FIG. 6 is a cross-section of the liquid crystal lens 1100, taken along a line that extends from a third point P3 to a fourth point P4. The first through fourth points P1 through P4 represent the midpoints of the outer sides of the unit pattern 140 of FIG. 3, according to an exemplary embodiment of the present invention.

Referring to FIGS. 4 through 6, in the first mode, the liquid crystal molecules 131 maintain their initial state of alignment, e.g., the state of being aligned in parallel to the first direction X.

In an exemplary embodiment of the present invention, since the light incident upon the bottom of the liquid crystal layer 130 may be polarized in the first direction X, the light may experience a refractive index corresponding to the direction of the long axes of the liquid crystal molecules 131 at any location in the unit pattern 140. For example, the light incident upon the bottom of the liquid crystal layer 130 may experience the same refractive index at any location in the unit pattern 140. Thus, the light incident upon the bottom of the liquid crystal layer 130 may travel straight, without its path being changed, throughout the liquid crystal layer 130. As a result, light incident upon the bottom of the first substrate 101 may travel straight within the liquid crystal lens 1100 and may be emitted toward the top of the second substrate 102, while maintaining its path.

Figure 7:
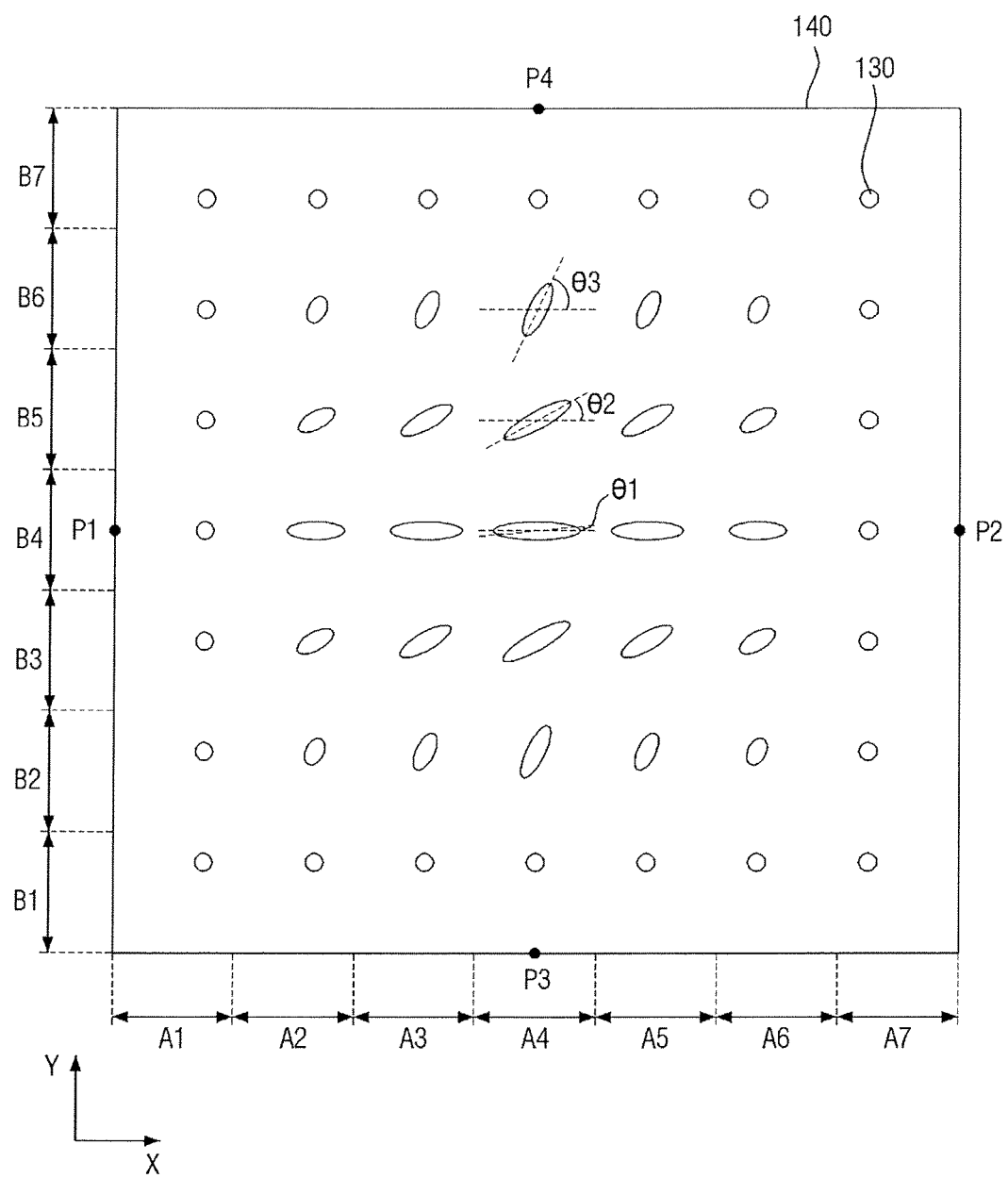
FIG. 7 is a plan view illustrating the liquid crystal lens of FIG. 3 in a second mode according to an exemplary embodiment of the present invention.
Figure 8:
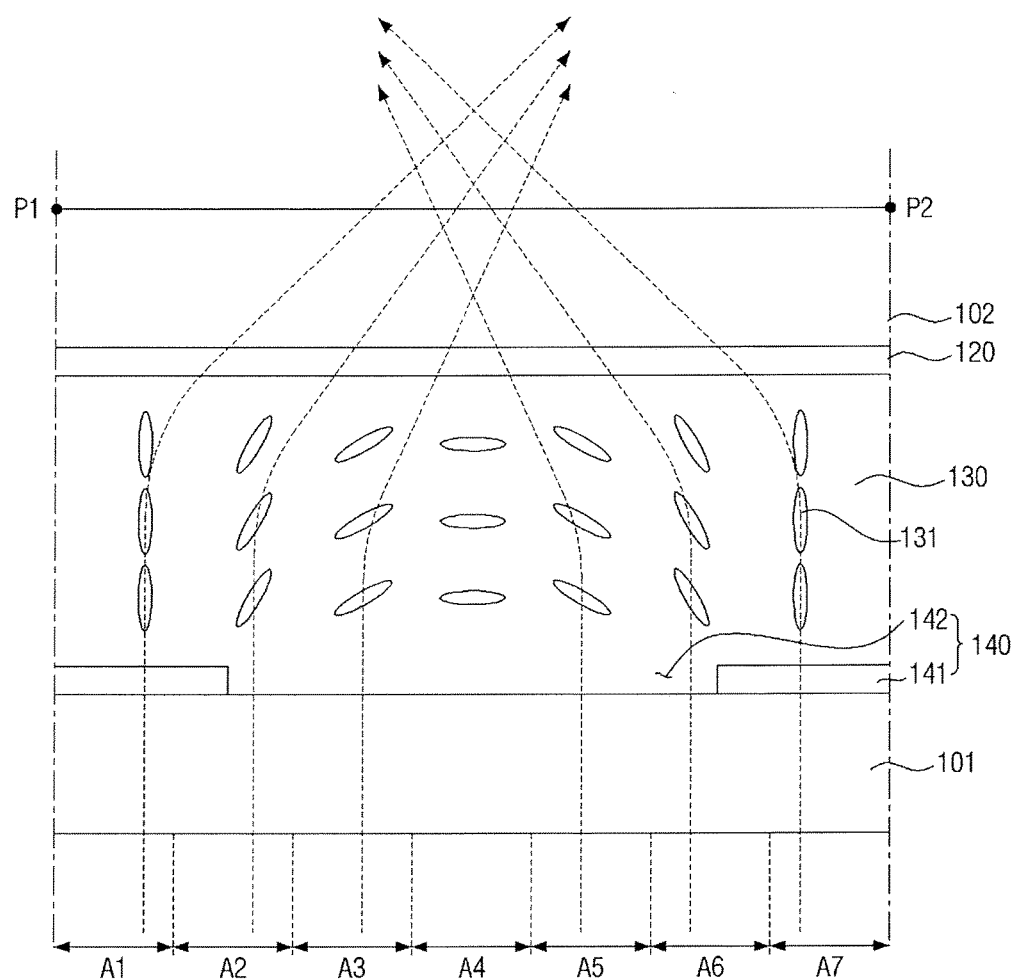
FIG. 8 is a cross-sectional view taken along a line that extends in the first direction X, illustrating the liquid crystal lens of FIG. 3 in the second mode, according to an exemplary embodiment of the present invention.
Figure 9:
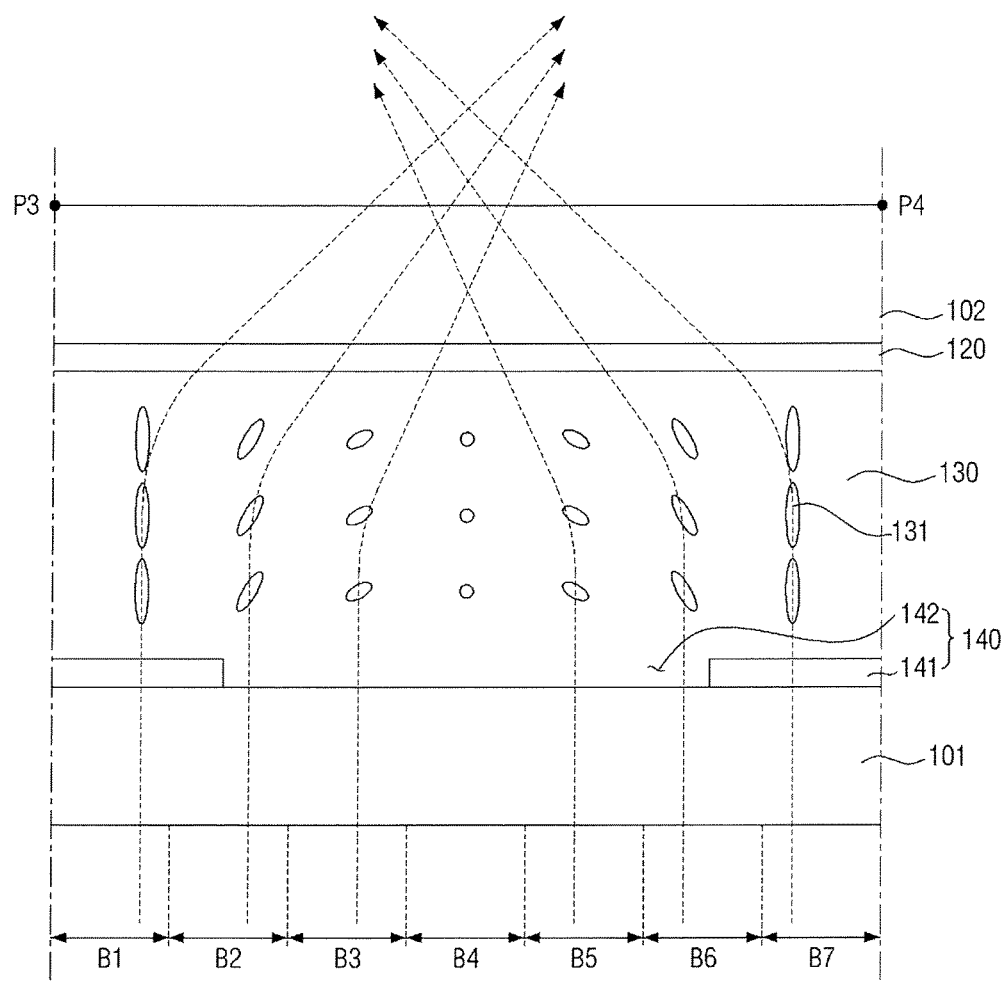
FIG. 9 is a cross-sectional view taken along a line that extends in the second direction Y, illustrating the liquid crystal lens of FIG. 3 in the second mode, according to an exemplary embodiment of the present invention.

FIG. 7 is a plan view illustrating the liquid crystal lens of FIG. 3 in a second mode according to an exemplary embodiment of the present invention. FIG. 8 is a cross-sectional view taken along a line that extends in the first direction X, illustrating the liquid crystal lens of FIG. 3 in the second mode, according to an exemplary embodiment of the present invention. FIG. 9 is a cross-sectional view taken along a line that extends in the second direction Y, illustrating the liquid crystal lens of FIG. 3 in the second mode, according to an exemplary embodiment of the present invention.

The second mode is a mode of operation in which the first and second voltages provided to the first and second electrodes 110 and 120 differ from each other. For example, the second mode is a mode in which the difference between the first and second voltages is not zero. In the second mode, an electric field may be formed between the first and second electrodes 110 and 120. As a result, the liquid crystal molecules 131 may be aligned to be oriented in different directions in different areas in the unit pattern 140.

For example, FIG. 8 is a cross-section of the liquid crystal lens 1100, taken along a line that extends from the first point P1 to the second point P2. FIG. 9 is a cross-section of the liquid crystal lens 1100, taken along a line that extends from the third point P3 to the fourth point P4. The first through fourth points P1 through P4 represent the midpoints of the outer sides of the unit pattern 140 of FIG. 3, according to an exemplary embodiment of the present invention.

For convenience of description, the unit pattern 140 may be divided into a plurality of areas. For example, the unit pattern 140 may be divided into seven equal areas A1 through A7 along the first direction X, and the unit pattern 140 may also be divided into seven equal areas B1 through B7 along the second direction Y. The overlapping area of one of the areas A1 through A7 and one of the areas B1 through B7 may be referred to as AxBy (each of x and y being 1-7).

For example, the overlapping area of the area A4 and the area B4, at the center of the unit pattern 140, may be referred to as A4B4.

Referring to FIGS. 7 through 9, in the second mode, an electric field may be formed in a part of the liquid crystal layer 130 overlapping with the unit pattern 140 to have different magnitudes and different directions in different areas of the unit pattern 140.

The electric field is strong in an area of a unit pattern 140 where the first and second electrodes 110 and 120 overlap. The electric field decreases in a direction away from the overlap of the first and second electrodes 110 and 120. Thus, the closer to the center of the unit pattern 140, the distance between the overlap of first and second electrodes 110 and 120 increases, and the electric field between the first and second electrodes 110 and 120 decreases.

The alignment of the liquid crystal molecules 131 may be determined by measuring the degree of rotation of the liquid crystal molecules 131 on the plane where the first electrode 110 is disposed, e.g., an azimuthal angle of the liquid crystal molecules 131, and by measuring the degree with which the liquid crystal molecules 131 are tilted with respect to a direction perpendicular to the plane where the first electrode 110 is disposed, e.g., a polar angle of the liquid crystal molecules 131. For example, the polar angle may be measured with respect to the third direction Z, and the azimuth angle may be measured with respect to the first direction X or the second direction Y.

Since the electric field decreases in a direction away from the overlap of the first and second electrodes 110 and 120, and conversely, increases in a direction from the center of the unit pattern 140 toward the outer perimeter of the unit pattern 140, the polar angle of the liquid crystal molecules 131 decreases in a direction toward the sides (e.g., the outer perimeter) of the unit pattern 140. For example, in the area A4B4, the polar angle of the liquid crystal molecules 131 is about 90 degrees (e.g., about 90 degrees with respect to the third direction Z), and the liquid crystal molecules 131 are about parallel to the XY plane. In a direction toward the sides of the unit pattern 140, the polar angle of the liquid crystal molecules 131 is decreased to be, for example, about 0 degrees in the area A1B4. For example, in the area A1B4, the liquid crystal molecules 131 may be about parallel to the third direction Z, and thus, may have a polar angle of about 0 degrees with respect to the third direction Z, as shown in FIGS. 7 to 9. It is understood that the angles described above are approximate and may vary along the depth of the liquid crystal layer 130.

In addition, in a direction from the center of the unit pattern 140 toward a side of the unit pattern 140, the azimuthal angle is increased, as shown in FIGS. 7 to 9.

For example, referring to FIG. 7, liquid crystal molecules 131 in the area A4B4 may have a first azimuthal angle $\theta 1$, liquid crystal molecules 131 in an area A4B5 may have a second azimuthal angle $\theta 2$ greater than the first azimuthal angle $\theta 1$, and liquid crystal molecules 131 in an area A4B6 may have a third azimuthal angle $\theta 3$ greater than the second azimuthal angle $\theta 2$.

Referring to FIGS. 8 and 9, the closer to the sides of the unit pattern 140, the more perpendicular the electric field, formed in the liquid crystal layer 130, becomes to the plane where the first electrode 110 is disposed. The closer to the center of the unit pattern 140, the more parallel the electric field, formed in the liquid crystal layer 130, becomes to the plane where the first electrode 110 is disposed. In an exemplary embodiment of the present invention, the liquid crystal molecules 131 have positive dielectric anisotropy, and thus, the stronger the electric field formed in the liquid crystal layer 130, the more the liquid crystal molecules 131 may be aligned in the direction of the electric field. Accordingly, the liquid crystal molecules 131 in each of the areas A1, A7, B1, and B7 may be aligned substantially parallel to the third direction Z. The liquid crystal molecules 131 in the area A4 B4, which is at the center of the unit pattern 140, may be aligned substantially parallel to the plane where the first electrode 110 is disposed. Since in an exemplary embodiment of the present invention, the initial alignment direction of the liquid crystal molecules 131 is the first direction X, the liquid crystal molecules 131 in the area A4B4 may be aligned in the first direction X.

Due to the aforementioned alignment of the liquid crystal molecules 131 in the second mode, the closer to the sides of the unit pattern 140, the lower the refractive index experienced by light passing through the liquid crystal layer 130, and the closer to the center of the unit pattern 140, the higher the refractive index experienced by the light passing through the liquid crystal layer 130. Thus, the path of light incident upon the liquid crystal layer 130 may change while the light is passing through the liquid crystal layer 130.

Figure 10:
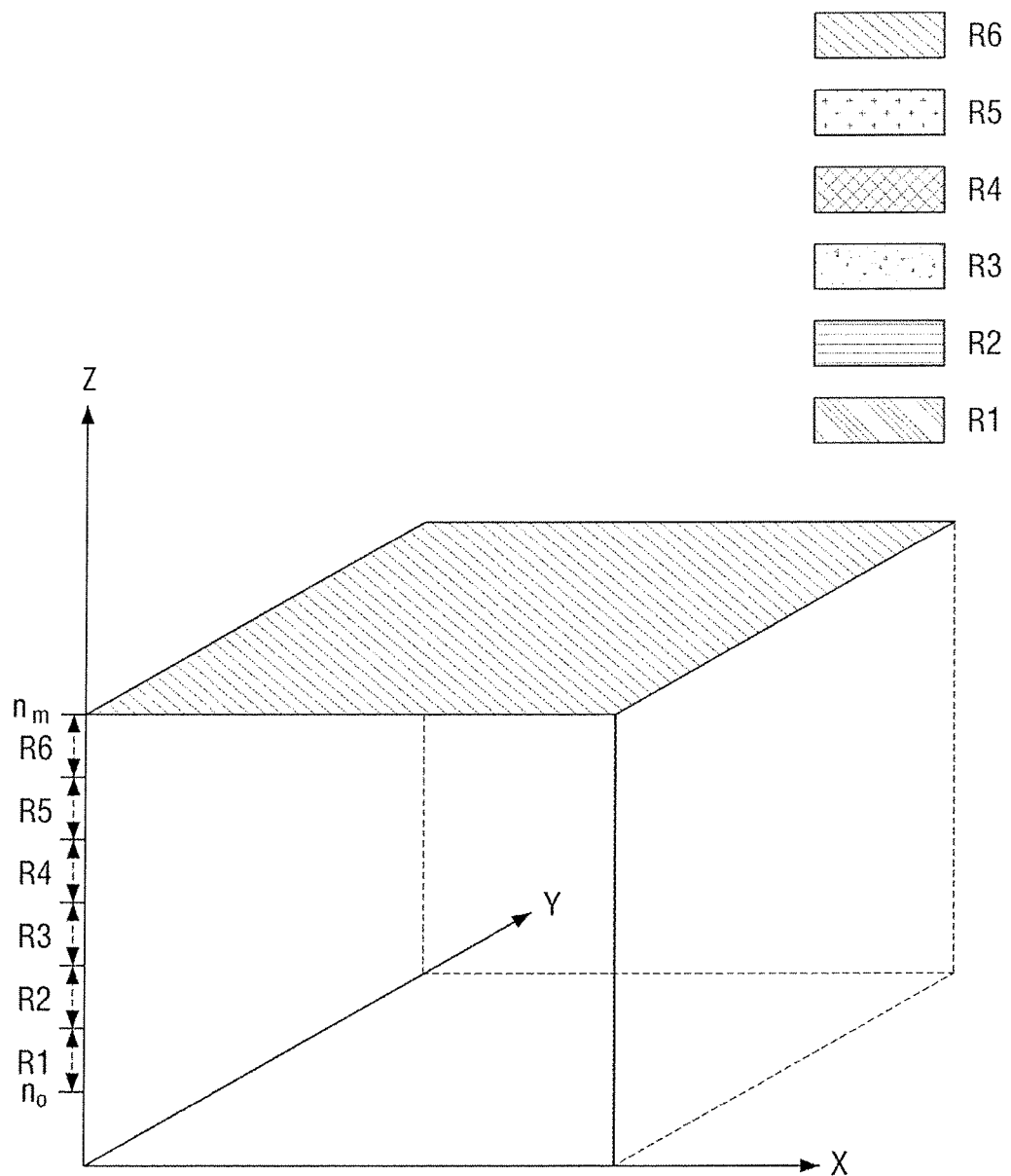
FIG. 10 is a graph illustrating the variation, in the first mode, of the refractive index of liquid crystal molecules in a unit pattern, according to an exemplary embodiment of the present invention.
Figure 11:
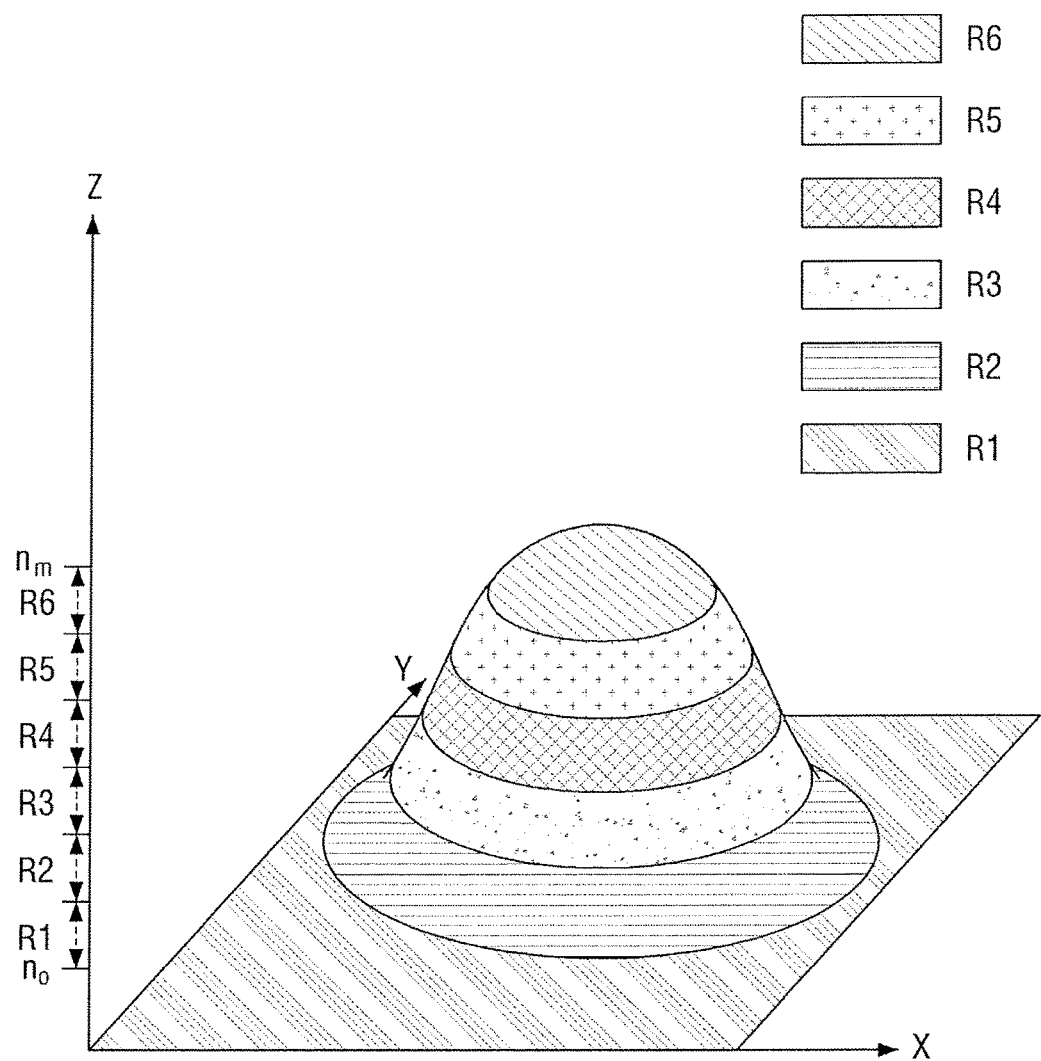
FIG. 11 is a graph illustrating the variation, in the second mode, of the refractive index of liquid crystal molecules in a unit pattern, according to an exemplary embodiment of the present invention.

FIG. 10 is a graph illustrating the variation, in the first mode, of the refractive index of liquid crystal molecules in a unit pattern, according to an exemplary embodiment of the present invention. FIG. 11 is a graph illustrating the variation, in the second mode, of the refractive index of liquid crystal molecules in a unit pattern, according to an exemplary embodiment of the present invention.

Referring to FIGS. 10 and 11, the x axis and the y axis represent the coordinates of locations in the liquid crystal layer 130, the z axis represents a refractive index, "$n_m$" represents a maximum refractive index that the liquid crystal layer 130 may have, and "$n_0$" represents a minimum refractive index that the liquid crystal layer 130 may have. The range of refractive indexes between the maximum refractive index $n_m$ and the minimum refractive index $n_0$ is divided into six equal sub-ranges, e.g., first through sixth sub-ranges R1 through R6. The first sub-range R1 is the lowest refractive index range.

Referring to FIG. 10, in the first mode, the liquid crystal layer 130 has the maximum refractive index $n_m$ in the entire unit pattern 140. For example, since the liquid crystal layer 130 has the same refractive index throughout the entire unit pattern 140, light passing through the liquid crystal layer 130 may travel straight without its path changed.

Referring to FIG. 11, in the second mode, the unit pattern 140 may have different refractive indexes in different areas. For example, in a direction toward the center of the unit pattern 140, the refractive index of the unit pattern 140 increases to approach or to be equal to the maximum refractive index $n_m$, at the center of the unit pattern 140. In a direction toward the sides of the unit pattern 140, the refractive index of the unit pattern 140 decreases to approach or to be equal to the minimum refractive index $n_0$ at the sides of the unit pattern 140. As illustrated in FIG. 11, refractive index measurements obtained from the unit pattern 140 in the second mode form a convex shape, which is symmetrical with respect to the center of the unit pattern 140.

Light travels straight in a medium with a uniform refractive index, but in a medium (such as, for example, a GRadient INdex (GRIN) lens structure) having a refractive index that gradually changes, as illustrated in FIG. 11, the path of light is bent from a part of the medium with a low refractive index to a part of the medium with a high refractive index. Thus, in the second mode, the path of light passing through the liquid crystal layer 130 is bent toward a part of the liquid crystal layer 130 with a high refractive index, as illustrated in FIGS. 8 and 9. The pattern of change of the path of light, illustrated in FIGS. 8 and 9, may be similar to the pattern of change of the path of light passing through a convex lens. For example, in the second mode, the liquid crystal layer 130 of the liquid crystal lens 1100 may collect light without a requirement of an additional convex lens.

The change of the path of light in the second mode may be detected equally in both the first and second directions X and Y. Thus, a 3D image may be viewed as having the same quality in all directions.

Figure 12:
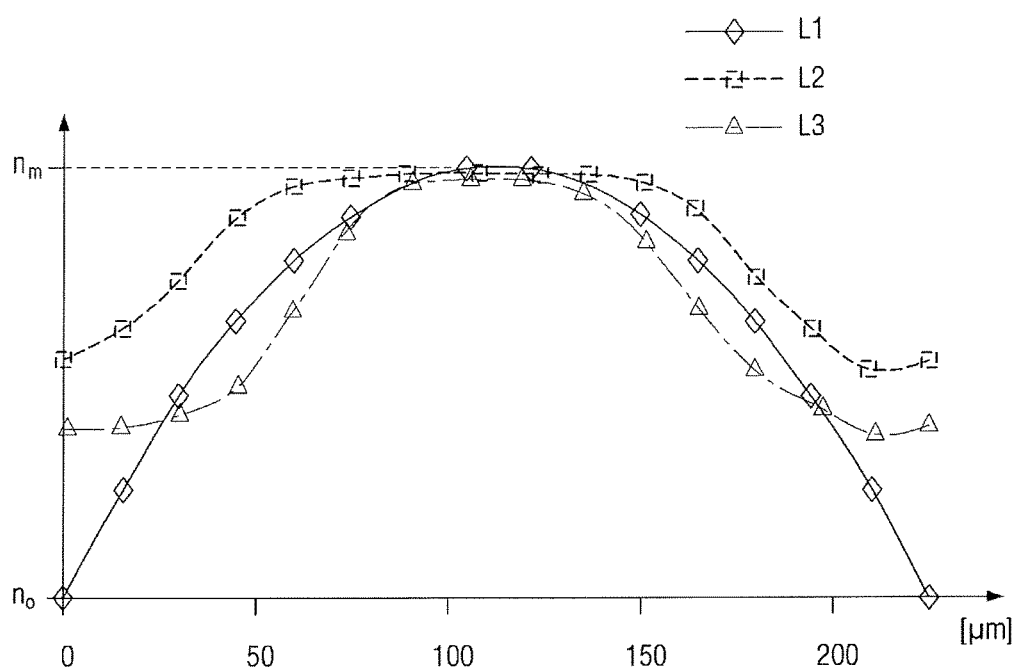
FIG. 12 is a graph illustrating refractive index measurements obtained from a unit pattern having a 200 µm long axis, according to an exemplary embodiment of the present invention.

FIG. 12 is a graph illustrating refractive index measurements obtained from a unit pattern having a 200 μm long axis, according to an exemplary embodiment of the present invention. FIG. 13 is a graph illustrating refractive index measurements obtained from a unit pattern having a 60 μm long axis, according to an exemplary embodiment of the present invention. The long axis of a unit pattern 140 may be represented by the distance d1, as shown in FIG. 3.

Referring to FIG. 12, a first line L1 shows an ideal refractive index that can provide a good display quality along the long axis of a unit pattern 140 when the unit pattern 140 has a 200 μm long axis. The second and third lines L2 and L3 show refractive index measurements obtained along the long axis of a unit pattern 140, in the second mode, when the unit pattern 140 has a 200 μm long axis, in response to the first and second voltages provided to the first and second electrodes 110 and 120. An electric field formed in the liquid crystal layer 130 in the case of the third line L3 may be stronger than an electric field formed in the liquid crystal layer 130 in the case of the second line L2.

Figure 13:
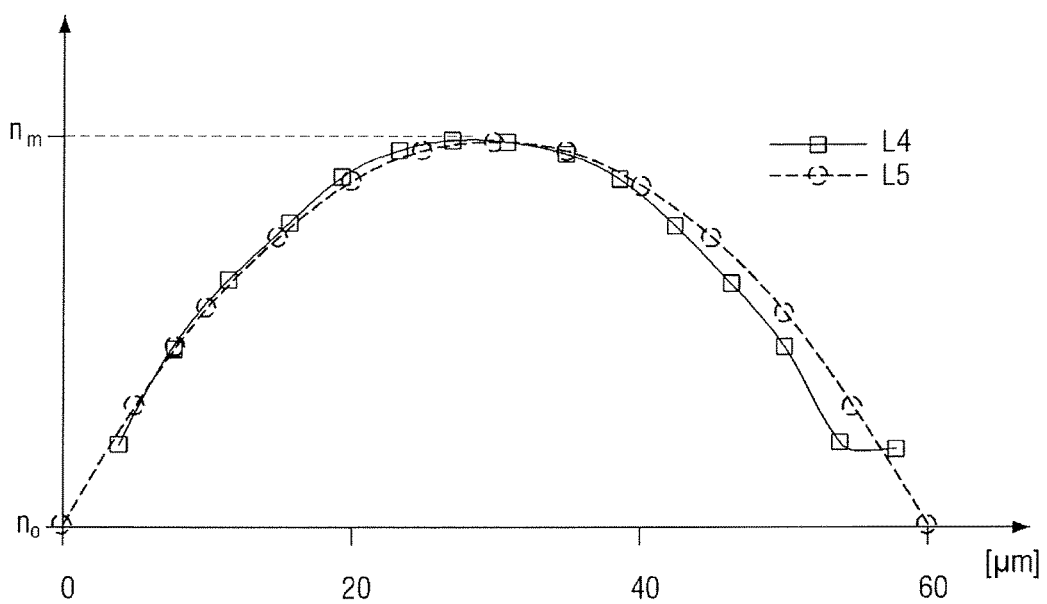
FIG. 13 is a graph illustrating refractive index measurements obtained from a unit pattern having a 60 µm long axis, according to an exemplary embodiment of the present invention.

Referring to FIG. 13, a fourth line L4 shows an ideal refractive index that can provide a good display quality along the long axis of a unit pattern 140 when the unit pattern 140 has a 60 μm long axis. A fifth line L5 shows refractive index measurements obtained along the long axis of a unit pattern 140, in the second mode, when the unit pattern 140 has a 60 μm long axis, in response to the first and second voltages provided to the first and second electrodes 110 and 120.

Referring to FIG. 12, in the case of the unit pattern 140 having a 200 μm long axis, the second and third lines L2 and L3 may show different tendencies from the first line L1. For example, even when the magnitude of the electric field formed in the liquid crystal layer 130 is controlled, and as a result, the maximum refractive index $n_m$ can be obtained from the center of the unit pattern 140, the minimum refractive index $n_0$ cannot be achieved at the sides of the unit pattern 140. Accordingly, an image provided by a liquid crystal lens having the unit pattern 140 with a 200 μm long axis may appear differently depending on the location of a user. As a result, the display quality of the image may deteriorate.

Referring to FIG. 13, when the unit pattern 140 has a 60 μm long axis, the fourth and fifth lines L4 and L5 show similar tendencies to each other. Accordingly, an image provided by a liquid crystal lens with a 60 μm long axis may appear to be substantially uniform at any location of the user. As a result, the display quality of the image may be increased.

Figure 14:
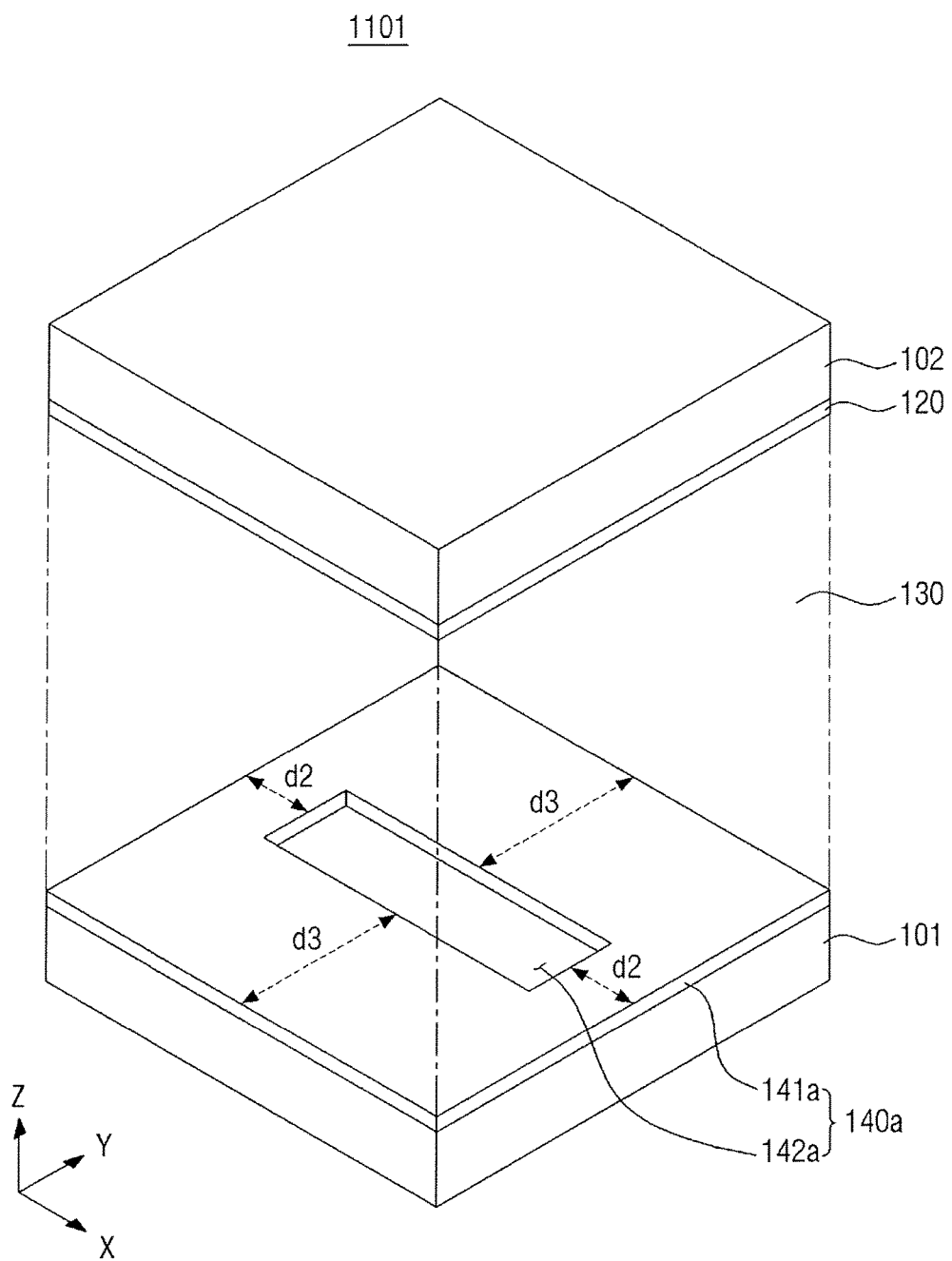
FIG. 14 is a perspective view illustrating a unit pattern of a liquid crystal lens according to an exemplary embodiment of the present invention.

FIG. 14 is a perspective view illustrating a unit pattern of a liquid crystal lens according to an exemplary embodiment of the present invention.

Referring to FIG. 14, in an exemplary embodiment of the present invention, the length by which a pattern electrode 141a extends from the sides of a unit pattern 140a may differ from one area of a unit pattern 140a to another area of the unit pattern 140a. For example, the pattern electrode 141a may extend from the sides of the unit pattern 140a by a second length d2 in a first direction X and by a third length d3, which is longer than the second length d2, in a second direction Y. An aperture 142a, which is disposed at the center of the unit pattern 140a, may be formed in a rectangular shape on a plane where a first electrode 110a is disposed.

Due to the aforementioned shape of the pattern electrode 141a, a magnitude of the electric field formed in the liquid crystal layer 130, measured at locations along the second direction Y, may be greater than a magnitude of the electric field formed in the liquid crystal layer 130, measured at locations along the first direction X. Thus, a viewing angle may be increased more in the second direction Y than in the first direction X. However, the present invention is not limited thereto. For example, alternatively, the second length d2 may be longer than the third length d3, in which case, a viewing angle may be more increased in the first direction X than in the second direction Y.

Figure 15:
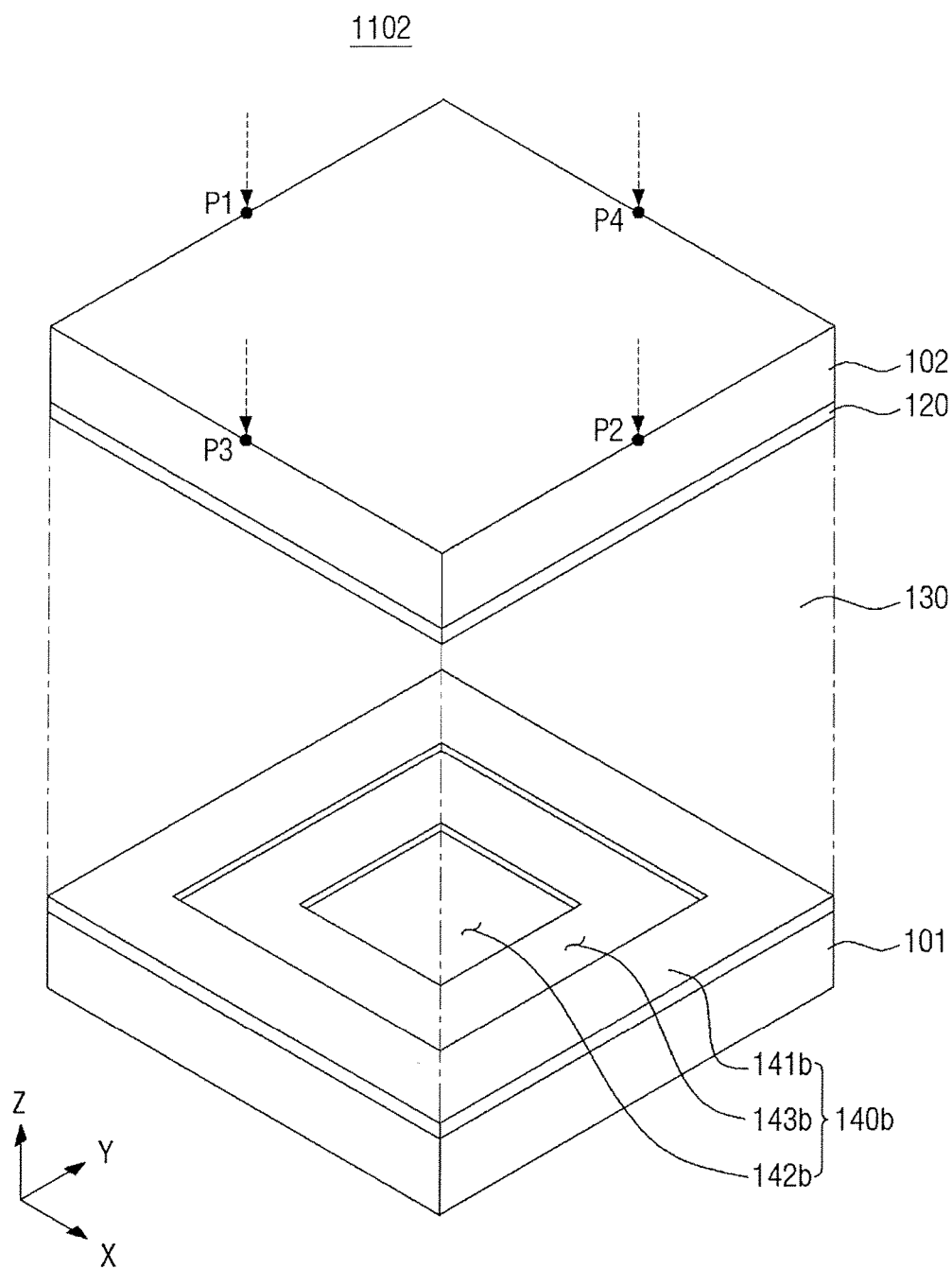
FIG. 15 is a perspective view illustrating a unit pattern of a liquid crystal lens according to an exemplary embodiment of the present invention.
Figure 16:
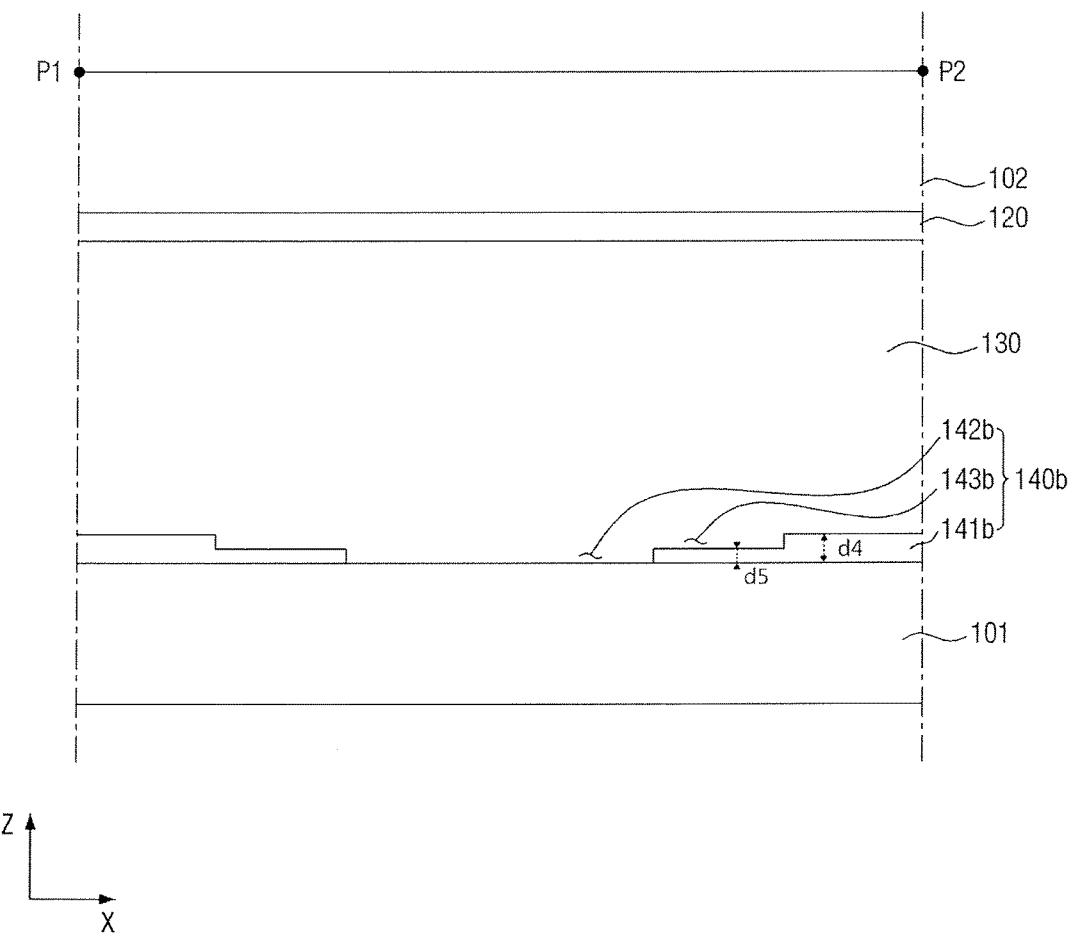
FIG. 16 is a cross-sectional view taken along the first direction X, illustrating the liquid crystal lens of FIG. 15, according to an exemplary embodiment of the present invention.

FIG. 15 is a perspective view illustrating a unit pattern of a liquid crystal lens according to an exemplary embodiment of the present invention. FIG. 16 is a cross-sectional view taken along the first direction X, illustrating the liquid crystal lens of FIG. 15, according to an exemplary embodiment of the present invention.

The cross-section of FIG. 16 is taken along a line that extends from a first point P1 to a second point P2.

Referring to FIGS. 15 and 16, a unit pattern 140b includes first and second sub-pattern electrodes 141b and 143b.

The first sub-pattern electrode 141b is disposed adjacent to the sides of the unit pattern 140b and the first sub-pattern electrode 141b has a first height d4. The second sub-pattern electrode 143b is disposed adjacent to the inner sides of the first sub-pattern electrode 141b and the second sub-pattern electrode 143b has a second height d5, which is different from the first height d4. The second height d5 may be smaller than the first height d4, but the present invention is not limited thereto. For example, alternatively, the second height d5 may be larger than the first height d4. An aperture 142b may be disposed on the inside of the second sub-pattern electrode 143b.

Due to the aforementioned structure of the unit pattern 140b, the refractive index of the unit pattern 140b may vary gradually from one area of the unit pattern 140b to another area of the unit pattern 140b. As a result, display quality may be increased.

Figure 17:
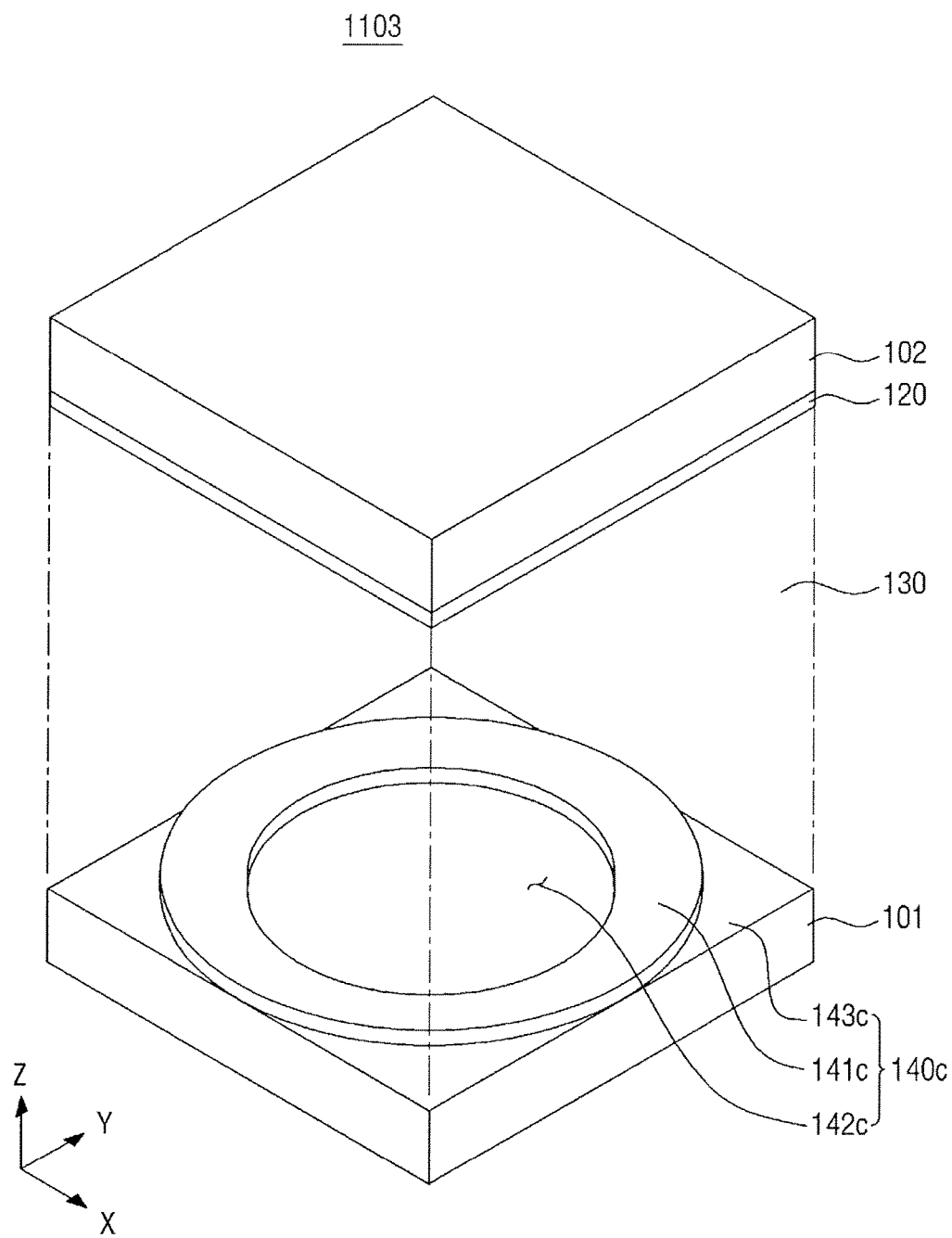
FIG. 17 is a perspective view illustrating a unit pattern of a liquid crystal lens according to an exemplary embodiment of the present invention.

FIG. 17 is a perspective view illustrating a unit pattern of a liquid crystal lens according to an exemplary embodiment of the present invention.

Referring to FIG. 17, a unit pattern 140c includes separation portions 143c, a pattern electrode 141c and an aperture 142c.

The separation portions 143c, which correspond to areas where no transparent conductive material is disposed, are disposed at corners of the unit pattern 140c. Due to the presence of the separation portions 143c, the pattern electrode 141c may be formed in a circular shape on a plane where a first electrode 110 is disposed, and the aperture 142c may also be formed in a circular shape on the plane where the first electrode 110 is disposed.

Since the pattern electrode 141c may be formed in a circular shape on the plane where the first electrode 110 is disposed, the difference in display quality between a case in which a liquid crystal lens 1103 is viewed in a first direction X or in a case in which the liquid crystal lens 1103 is viewed in a second direction Y may be reduced.

Figure 18:
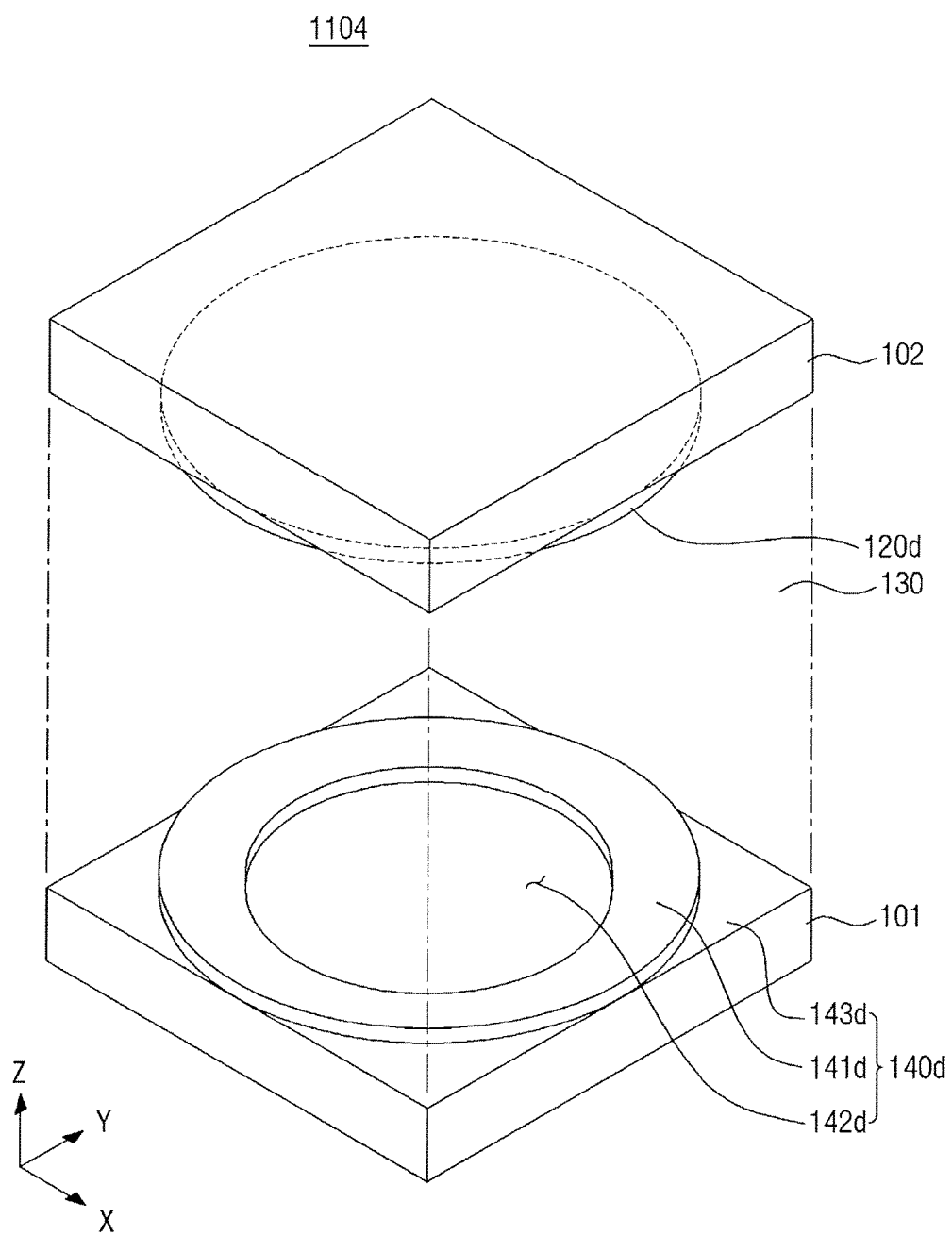
FIG. 18 is a perspective view illustrating a unit pattern of a liquid crystal lens according to an exemplary embodiment of the present invention.

FIG. 18 is a perspective view illustrating a unit pattern of a liquid crystal lens according to an exemplary embodiment of the present invention.

Referring to FIG. 18, the second electrode 120 may further include a first counter pattern electrode 120d opposite to the unit pattern 140d, with the liquid crystal layer 130 disposed therebetween.

The first counter pattern electrode 120d may be formed to overlap with a pattern electrode 141d. A part of the unit pattern 140d, e.g., the aperture 142d, that does not overlap with the first counter pattern electrode 120d, may remain as an aperture where no transparent conductive material is provided.

Since the pattern electrode 141d may be formed in a circular shape on the plane where the first electrode 110 is disposed, the difference in display quality between a case in which a liquid crystal lens 1103 is viewed in a first direction X or in a case in which the liquid crystal lens 1103 is viewed in a second direction Y may be reduced.

Figure 19:
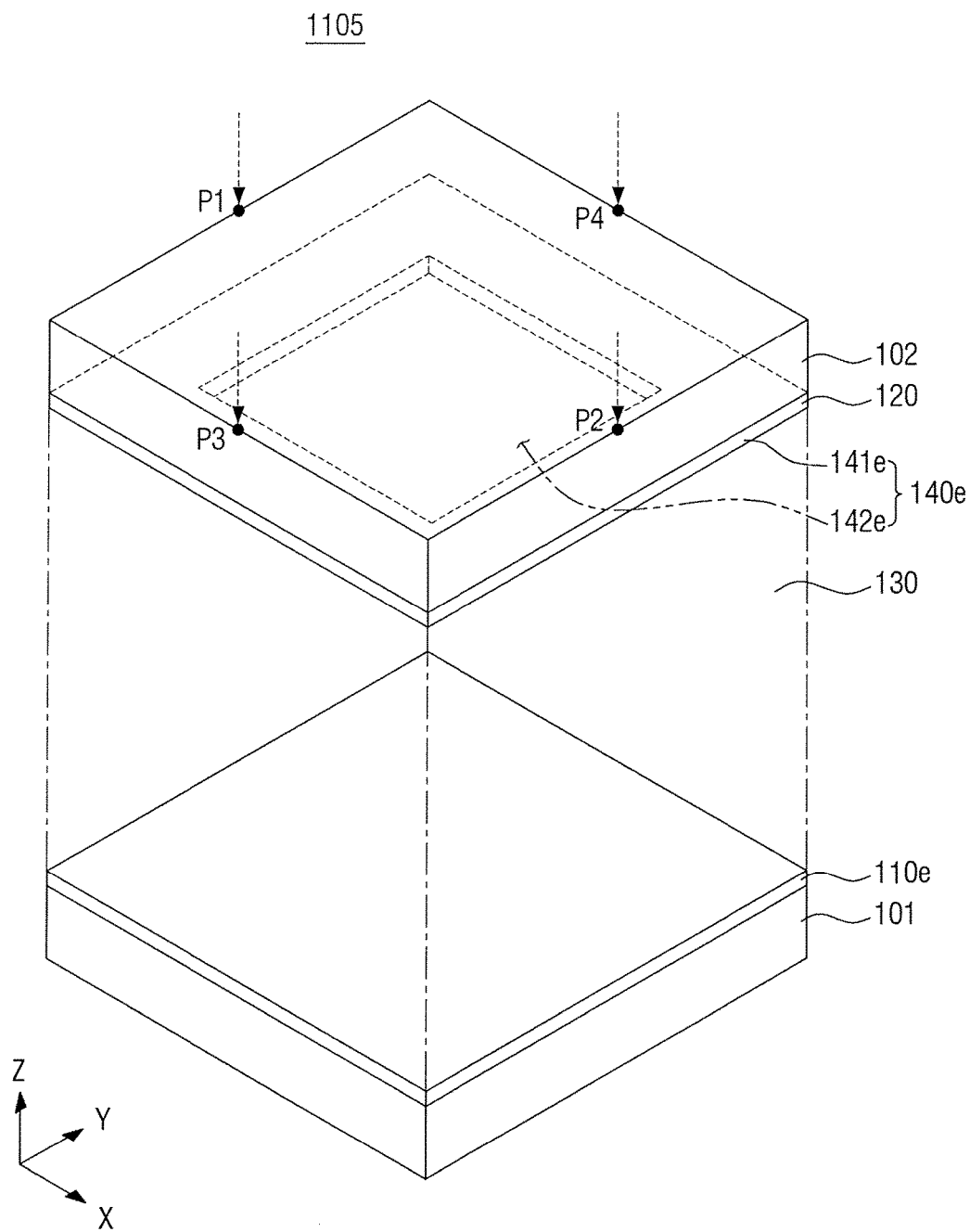
FIG. 19 is a perspective view illustrating a unit pattern of a liquid crystal lens according to an exemplary embodiment of the present invention.
Figure 20:
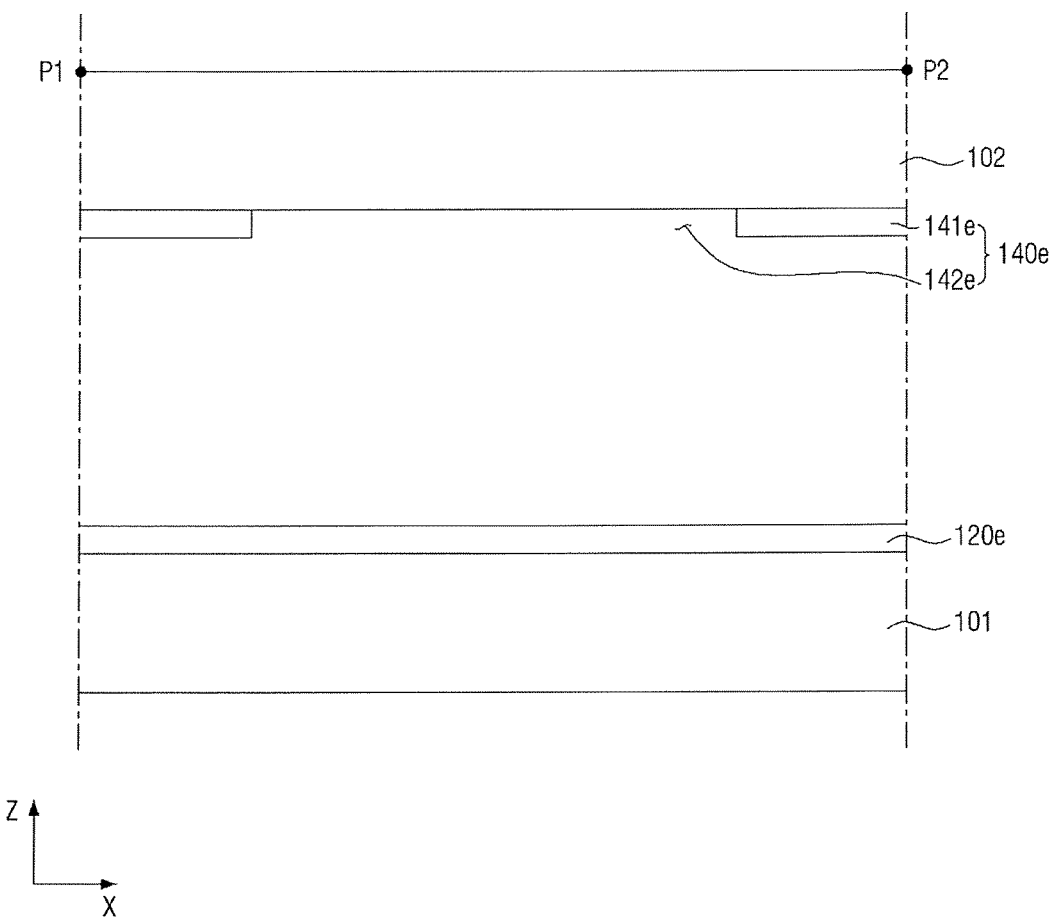
FIG. 20 is a cross-sectional view taken along the first direction X, illustrating the liquid crystal lens of FIG. 19, according to an exemplary embodiment of the present invention.

FIG. 19 is a perspective view illustrating a unit pattern of a liquid crystal lens according to an exemplary embodiment of the present invention. FIG. 20 is a cross-sectional view taken along the first direction X, illustrating the liquid crystal lens of FIG. 19, according to an exemplary embodiment of the present invention.

The cross-section of FIG. 19 is taken along a line that extends from a first point P1 to a second point P2.

Referring to FIG. 19, a first electrode 110e is disposed on a first substrate 101, and a second electrode 120 is disposed on a second substrate 102. Accordingly, an electric field is formed in a liquid crystal layer 130 in an opposite direction to the direction in which an electric field is formed in the liquid crystal layer 130 of FIGS. 8 and 9. Thus, liquid crystal molecules may be tilted such that the alignment of the liquid crystal molecules may become opposite to the alignment of the liquid crystal molecules 131 of FIGS. 8 and 9.

According to an exemplary embodiment of the present invention, in a second mode, light passing through the center of a unit pattern 140e has a high refractive index, and light passing through the sides of the unit pattern 140e has a low refractive index. Thus, in an exemplary embodiment of the present invention, light may be properly collected. For example, the arrangement of the first and second electrodes 110e and 120 may change, and even when it does, the liquid crystal lens 1105 may be able to operate properly with the same characteristics.

The unit pattern 140e, including a pattern electrode 141a and an aperture 142e, may have a square shape, a rectangular shape, a polygonal shape, a circular shape, or other shapes including straight and/or curved parts.

Figure 21:
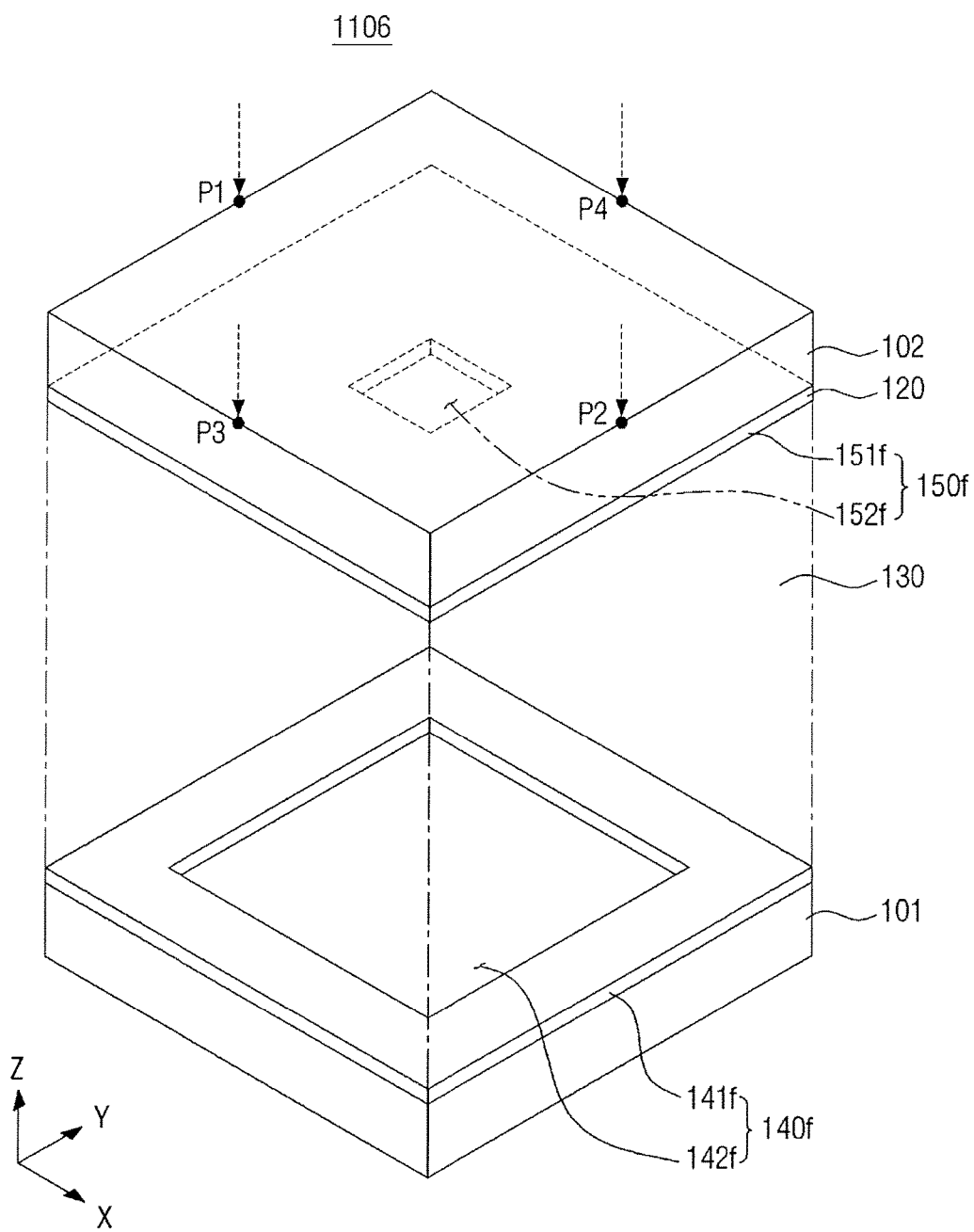
FIG. 21 is a perspective view illustrating a unit pattern of a liquid crystal lens according to an exemplary embodiment of the present invention.
Figure 22:
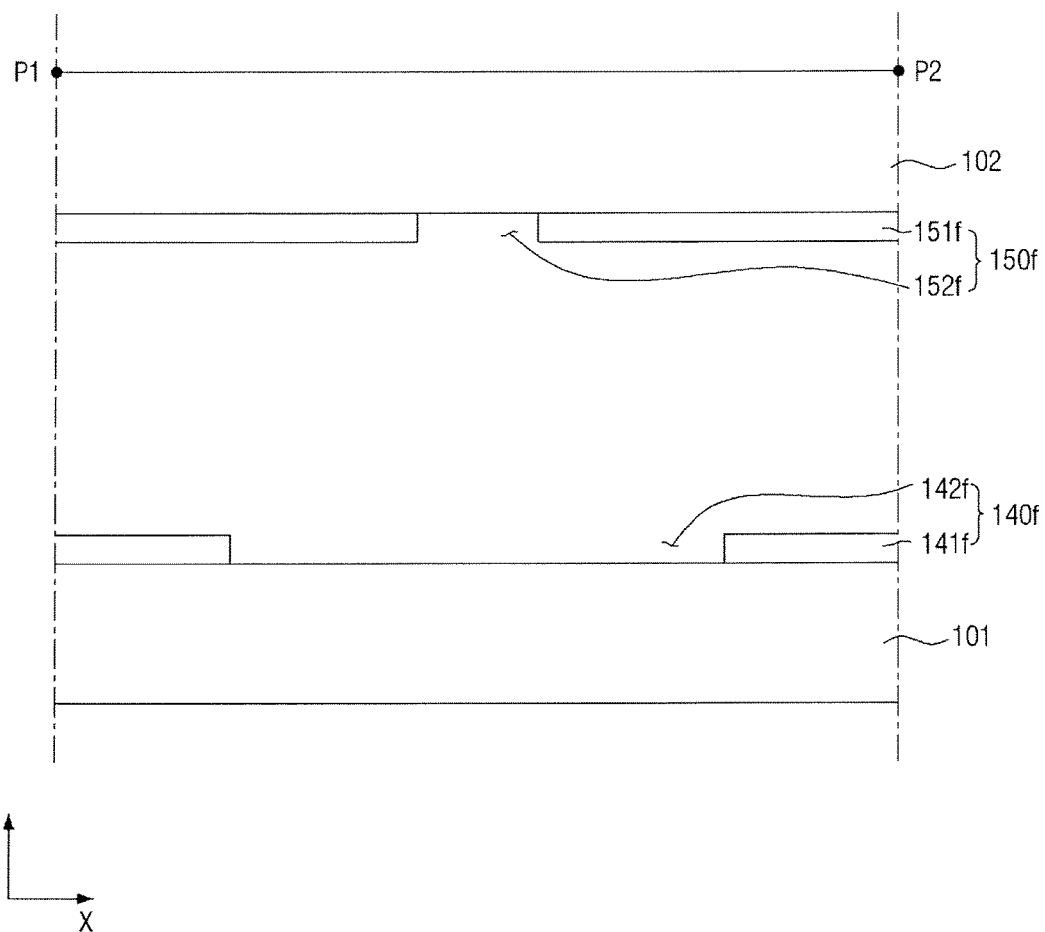
FIG. 22 is a cross-sectional view taken along the first direction X, illustrating the liquid crystal lens of FIG. 21, according to an exemplary embodiment of the present invention.

FIG. 21 is a perspective view illustrating a unit pattern of a liquid crystal lens according to an exemplary embodiment of the present invention. FIG. 22 is a cross-sectional view taken along the first direction X, illustrating the liquid crystal lens of FIG. 21, according to an exemplary embodiment of the present invention.

The cross-section of FIG. 22 is taken along a line that extends from a first point P1 to a second point P2.

In an exemplary embodiment of the present invention, a second electrode 120 further includes a second counter pattern 150f.

The second counter pattern 150f corresponds to a unit pattern 140f and includes a second counter pattern electrode 151f and a second counter aperture 152f.

The second counter pattern electrode 151f is disposed adjacent to the sides of the second counter pattern 150f, and the second counter aperture 152f is disposed on the inside of the second counter pattern electrode 151f. The description of a unit pattern 141f may also be applicable to the second counter pattern electrode 151f, and the description of an aperture 142f may also be applicable to the second counter aperture 152f.

The second counter aperture 152f, which is provided in the second electrode 120, overlaps, but does not correspond exactly to the aperture 142f. In other words, the aperture 142f may not fully overlap the second counter aperture 152f because the second counter aperture 152f may be smaller than the aperture 142f. If the second counter aperture 152f and the aperture 142f are formed to correspond exactly with each other (e.g., fully overlap each other), an electric field formed in a liquid crystal layer 130 may be oriented mainly in the third direction Z. As a result, due to the direction of the electric field, the liquid crystal lens 1106 may not be able to properly control light.

In an exemplary embodiment of the present invention, the second counter aperture 152f overlaps with, and is completely covered by, the aperture 142f, but the present invention is not limited thereto. Alternatively, the second counter aperture 152f may be formed to not only overlap with, but also completely cover, the aperture 142f.

Figure 23:
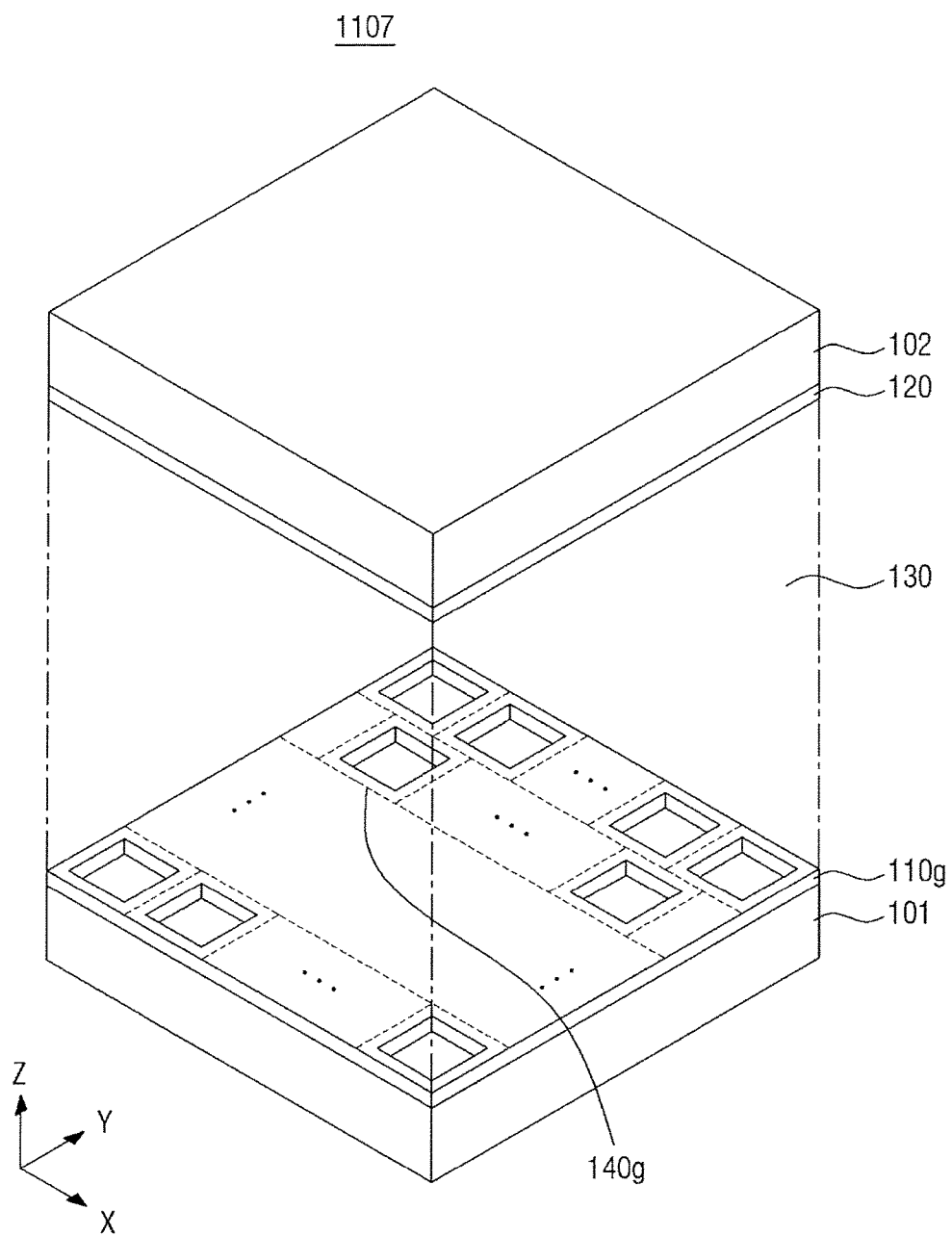
FIG. 23 is a perspective view illustrating a unit pattern of a liquid crystal lens according to an exemplary embodiment of the present invention.

FIG. 23 is a perspective view illustrating a unit pattern of a liquid crystal lens according to an exemplary embodiment of the present invention.

Referring to FIG. 23, unit patterns 140g of a liquid crystal lens 1107 are not arranged in a matrix.

For example, the unit patterns 140g may be arranged in a staggered formation in the first direction X or the second direction Y.

By arranging the unit patterns 140g in the staggered formation, the image quality of a stereoscopic 3D image displayed by the display device 30 may be increased in the second mode.

Figure 24:
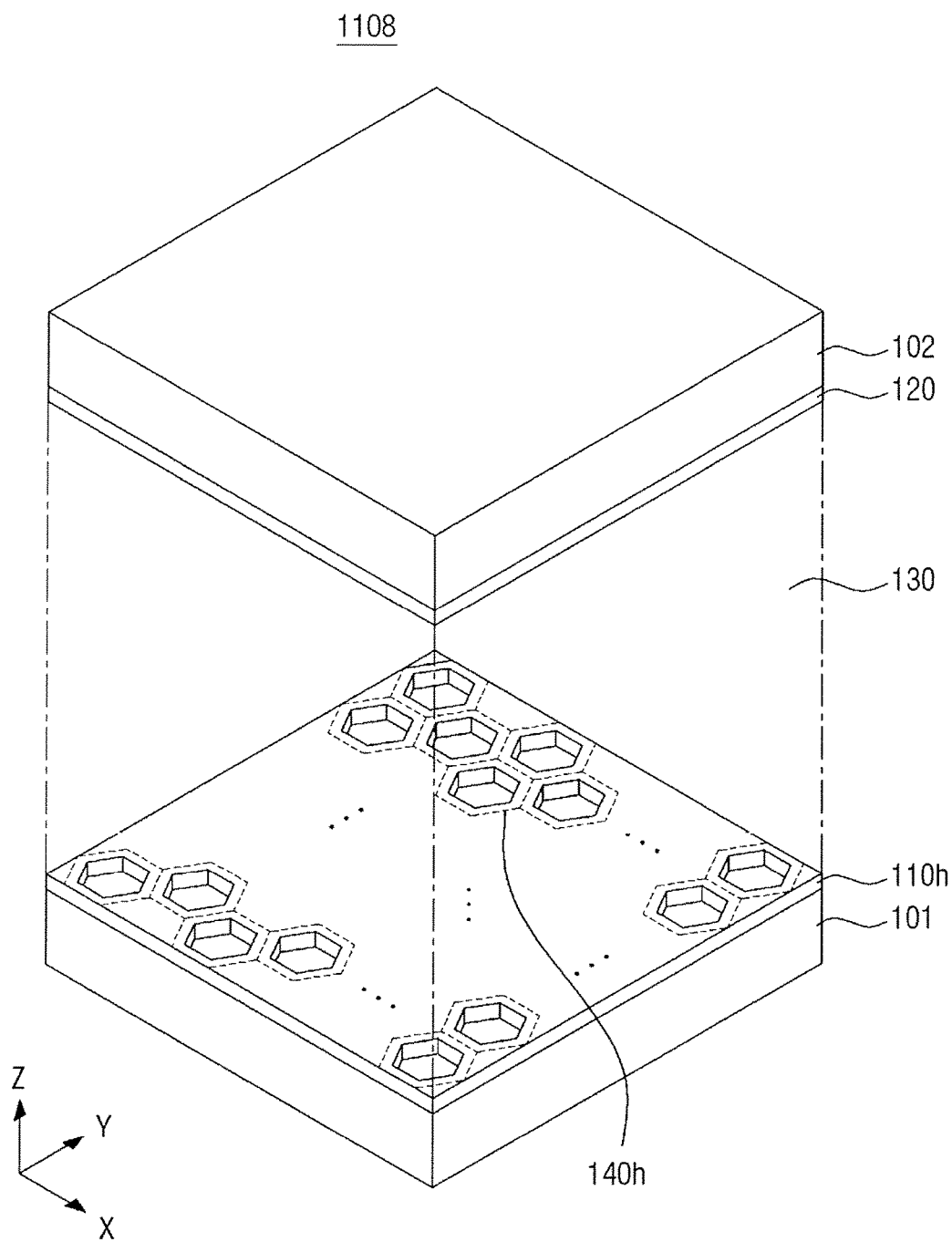
FIG. 24 is a perspective view illustrating a unit pattern of a liquid crystal lens according to an exemplary embodiment of the present invention.
Figure 25:
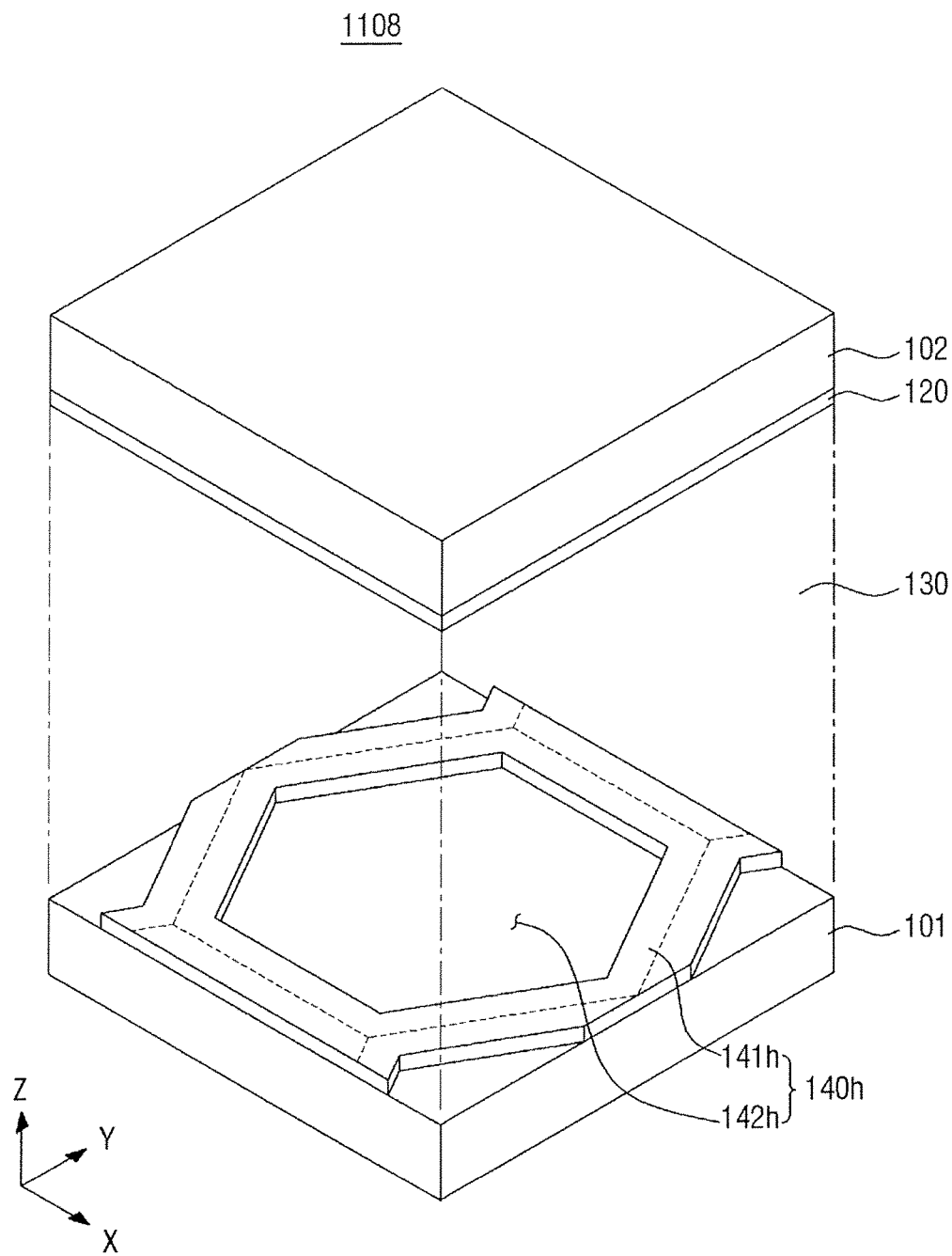
FIG. 25 is an enlarged perspective view illustrating a unit pattern of the liquid crystal lens of FIG. 24 according to an exemplary embodiment of the present invention.

FIG. 24 is a perspective view illustrating a unit pattern of a liquid crystal lens according to an exemplary embodiment of the present invention. FIG. 25 is an enlarged perspective view illustrating a unit pattern of the liquid crystal lens of FIG. 24 according to an exemplary embodiment of the present invention Referring to FIGS. 24 and 25, unit patterns 140h of a liquid crystal lens 1108 are arranged in a honeycomb pattern. By forming apertures 142h in the unit patterns 140h in a regular hexagonal shape, the image quality of a stereoscopic 3D image displayed by the display device 30 may be increased in the second mode.

Figure 26:
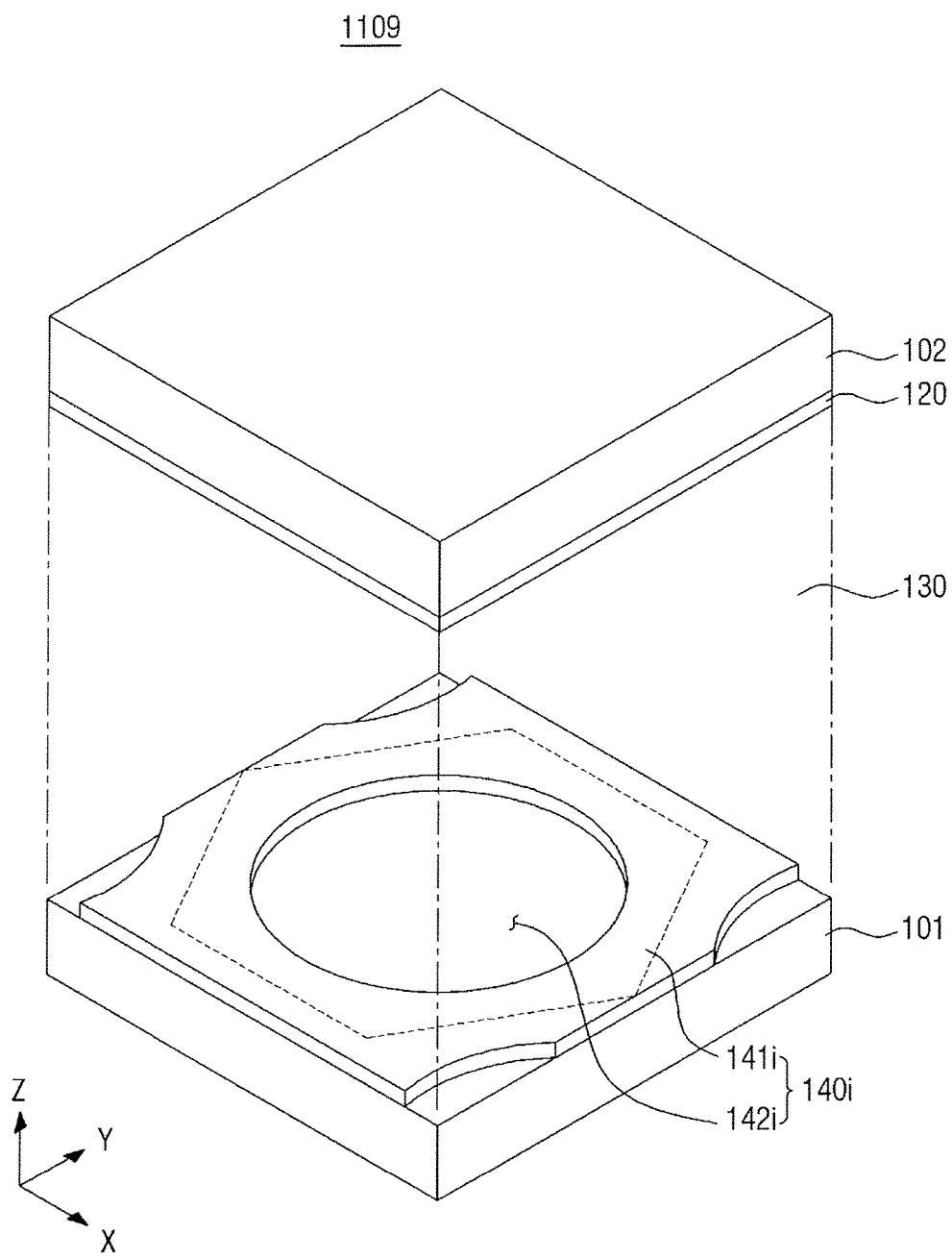
FIG. 26 is a perspective view illustrating a unit pattern of a liquid crystal lens according to an exemplary embodiment of the present invention.

FIG. 26 is a perspective view illustrating a unit pattern of a liquid crystal lens according to an exemplary embodiment of the present invention.

Referring to FIG. 26, a unit pattern 140i includes an aperture 142i, formed in a circular shape, on a plane where a first electrode 110 is disposed.

Since the aperture 142i is formed in a circular shape on the plane where the first electrode 110 is disposed, the difference in display quality between a case in which a liquid crystal lens 1109 is viewed in a first direction X or in a case in which the liquid crystal lens 1109 is viewed in a second direction Y may be reduced.

Figure 27:
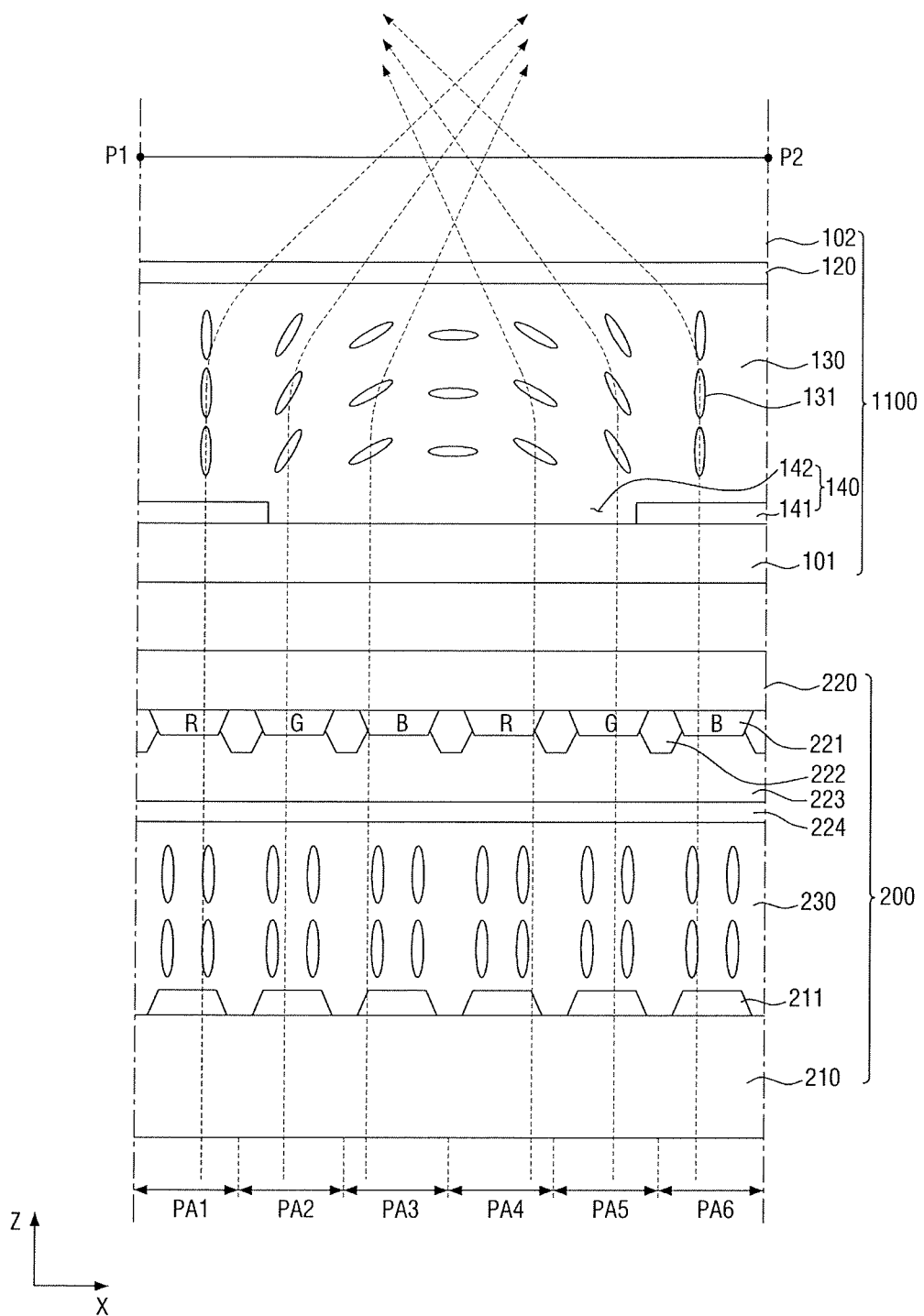
FIG. 27 is a cross-sectional view illustrating a display device according to an exemplary embodiment of the present invention.

FIG. 27 is a cross-sectional view illustrating a display device according to an exemplary embodiment of the present invention.

For example, FIG. 27 illustrates an exemplary display device including the liquid crystal lens 1100 of FIG. 8 and having an LCD panel as the apparatus 20.

Referring to FIG. 27, the display device includes an LCD panel 200 and the liquid crystal lens 1100.

The LCD panel 200 includes lower and upper substrates 210 and 220, which are opposite to each other, and a liquid crystal molecule layer 230, which is interposed between the lower and upper substrates 210 and 220. Pixel electrodes 211 are formed in pixel regions PA1 through PA6. The pixel regions PA1 through PA6 are defined on the lower substrate 210 and are arranged in a matrix. The pixel electrodes 211 are connected to switching devices such as thin-film transistors (TFTs) and are individually provided with a pixel voltage.

A common electrode 224, which is opposite to the pixel electrodes 211, is disposed below the upper substrate 220. Color filters 221 such as red (R), green (G) and blue (B) color filters may be disposed on the upper substrate 220 to correspond to the pixel regions PA1 through PA6. Black matrices 222 may be formed along the boundaries of the pixel regions PA1 through PA6. A planarization layer 223 may be interposed between the color filters 221 and the common electrode 224.

The liquid crystal molecule layer 230 is interposed between the lower and upper substrates 210 and 220. Liquid crystal molecules in the liquid crystal molecule layer 230 are rotated by an electric field formed between the pixel electrodes 211 and the common electrode 224. Thus, the liquid crystal molecules in the liquid crystal molecule layer 230 control the transmittance of the LCD panel 200.

A polarizer may be attached on the outside of the lower and upper substrates 210 and 220, respectively. As mentioned above, a polarizer may be attached on the outside of the first substrate 101 of the liquid crystal lens 1100. In this case, the polarizer on the upper substrate 220 may not be provided.

A backlight assembly may be disposed below the LCD panel 200.

The liquid crystal lens 1100 is disposed on the LCD panel 200. FIG. 27 illustrates an example in which the liquid crystal lens 1100 is spaced apart from the LCD panel 200, but the present invention is not limited thereto. For example, alternatively, the liquid crystal lens 1100 may be attached on the LCD panel 200.

A unit pattern 140 of the liquid crystal lens 1100 may be disposed to correspond to a plurality of pixel regions of the LCD panel 200. In an exemplary embodiment of the present invention, the unit pattern 140 corresponds to the six pixel regions PA1 through PA6. For example, the six pixel regions PA1 through PA6 corresponding to the color filters R, G, B, R, G, and B, respectively, are arranged within the width of the unit pattern 140.

In response to the liquid crystal lens 1100 being driven in the first mode, the liquid crystal lens 1100 does not modulate the path of light, and as a result, the display device may display a 2D image. In response to the liquid crystal lens 1100 being driven in the second mode, the display device may display a 3D image.

The optical characteristics of the liquid crystal lens 1100 in the second mode are similar to the optical characteristics of a convex lens. For example, the path of light incident upon the unit pattern 140 from the three pixel regions on the left side of the center of the unit pattern 140, e.g., the pixel regions PA1 through PA3, may be modulated in the same manner as the path of light passing through a left part of a convex lens, and as a result, the light incident from the pixel regions PA1 through PA3 may be bent in a rightward direction. The path of light incident upon the unit pattern 140 from the three pixel regions on the right side of the center of the unit pattern 140, e.g., the pixel regions PA4 through PA6, may be modulated in the same manner as the path of light passing through a right part of a convex lens, and as a result, the light incident from the pixel regions PA4 through PA6 may be bent in a leftward direction. In response to the light incident from the pixel regions PA1 through PA3 and the light incident from the pixel regions PA4 through PA6 being input to the left and right eyes of a user, the user may perceive a 3D image.

In an exemplary embodiment of the present invention, the six pixel regions PA1 through PA6 are arranged within the width of the unit pattern 140, but the present invention is not limited thereto. For example, more than six pixel regions may be arranged within the width of the unit pattern 140, in which case, a multi-view 3D image may be displayed. Also, by controlling the voltages applied to the first and second electrodes 110 and 120 of the liquid crystal lens 1100, the focal point of the liquid crystal lens 1100 may be controlled, and the distance at which 3D viewing is possible may be controlled. For example, if the user selects a viewpoint switching mode in the display device via a remote control, the voltages applied to the first and second electrodes 110 and 120 of the liquid crystal lens 1100 may be sequentially changed, and a viewpoint at which a 3D image can be properly seen may be found by moving the focal point of the liquid crystal lens 1100 forward or backward.

In an exemplary embodiment of the present invention, the upper substrate 220 of the LCD panel 200 and the first substrate 101 of the liquid crystal lens 1100 may be shared for use. Accordingly, either the upper substrate 220 of the LCD panel 200 or the first substrate 101 of the liquid crystal lens 1100 may not be provided.

In an exemplary embodiment of the present invention, the LCD panel 200 is provided as the apparatus 20, but alternatively, various other display panels such as an OLED panel, an LED panel, an inorganic EL panel, an FED panel, an SED panel, a PDP, a CRT panel, and an electrophoretic display (EPD) panel may also be used.

Also, in an exemplary embodiment of the present invention, the liquid crystal lens 1100 of FIG. 8 is used, but alternatively, various other liquid crystal lenses, according to the above-described exemplary embodiments of the present invention, may also be used.

While the present invention has been described with reference to exemplary embodiments thereof, it will be understood by those skilled in the art that various modifications and changes may be made thereto without departing from the spirit and scope of the present invention as defined in the following claims.

What is claimed is:

1. A liquid crystal lens, comprising:
   first and second electrodes facing each other; and
   a liquid crystal layer interposed between the first and second electrodes,
   wherein the first electrode includes a plurality of unit patterns formed in one integral body,
   wherein each unit pattern of the plurality of unit patterns includes a pattern electrode and an aperture, wherein the pattern electrode is disposed adjacent to a boundary of the unit pattern and the aperture is disposed inside the pattern electrode,
   wherein the unit pattern further includes separation portions with no electrode material disposed at corners of the unit pattern.

2. The liquid crystal lens of claim 1, wherein the aperture has a rectangular shape or a square shape on a plane on which the first electrode is disposed.

3. The liquid crystal lens of claim 1, wherein the aperture has a circular shape on a plane in which the first electrode is disposed.

4. The liquid crystal lens of claim 3, wherein
   an outer periphery of the pattern electrode has a circular shape on the plane in which the first electrode is disposed.

5. The liquid crystal lens of claim 1, wherein the aperture has a hexagonal shape on a plane in which the first electrode is disposed.

6. The liquid crystal lens of claim 1, wherein the aperture has a polygonal shape on a plane in which the first electrode is disposed.

7. The liquid crystal lens of claim 1, wherein the pattern electrode includes a first sub-pattern electrode, which is disposed adjacent to the boundary of the unit pattern, and a second sub-pattern electrode, which is disposed adjacent to inner sides of the first sub patter electrode, and
   wherein heights of the first and second sub-pattern electrodes differ from one another.

8. The liquid crystal lens of claim 1, wherein a long axis of the unit pattern has a length of 200 μm or less.

9. The liquid crystal lens of claim 1, wherein the second electrode has a flat surface parallel to a plane in which the first electrode is disposed.

10. The liquid crystal lens of claim 1, wherein the second electrode includes at least one first counter pattern, and the first counter pattern includes a first counter pattern electrode, wherein the first counter pattern electrode overlaps the pattern electrode.

11. The liquid crystal lens of claim 1, wherein the second electrode includes at least one first counter pattern, and the first counter pattern includes a first counter pattern electrode, which is disposed adjacent to a boundary of the first counter pattern, and a first counter aperture, which is disposed inside the first counter pattern electrode.

12. The liquid crystal lens of claim 1, wherein the plurality of unit patterns is arranged in a matrix.

13. The liquid crystal lens of claim 1, the plurality of unit patterns comprises at least a first row and a second row, wherein a unit pattern of the first row and a unit pattern of the second row, adjacent to the first row, are adjacent to each other and offset from each other in a column direction.

14. The liquid crystal lens of claim 1, wherein the plurality of unit patterns is arranged in a honeycomb pattern.

15. A display device, comprising:
    an apparatus for providing light; and
    a liquid crystal lens disposed on the apparatus,
    wherein the liquid crystal lens includes first and second electrodes facing each other, and a liquid crystal layer interposed between the first and second electrodes,
    wherein the first electrode includes a plurality of unit patterns formed in one integral body,
    wherein the unit pattern includes a first sub-pattern electrode, which is disposed adjacent to the boundary of the unit pattern, and a second sub-pattern electrode, which is disposed adjacent to inner sides of the first sub-pattern electrode, and
    wherein the second sub-pattern electrode directly contacts the first sub-pattern electrode.

16. The display device of claim 15, wherein the apparatus provides linearly polarized light to the liquid crystal lens.

17. The display device of claim 15, wherein the apparatus includes a display panel.

18. The display device of claim 17, wherein the display panel is an organic light-emitting diode (OLED) panel, a light-emitting diode (LED) panel, an inorganic electroluminescent (EL) display panel, a field emission display (FED) panel, a surface-conduction electron-emitter display (SED) panel, a plasma display panel (PDP), a cathode ray tube (CRT) panel, a liquid crystal display (LCD) panel or an electrophoretic display (EPD) panel.

19. The display device of claim 17, wherein the display panel includes a plurality of pixels arranged in a matrix, and the unit pattern overlaps two or more of the plurality of pixels.

20. A liquid crystal lens, comprising:
first and second electrodes facing each other; and
a liquid crystal layer interposed between the first and second electrodes,
wherein the first electrode includes a plurality of unit patterns formed in one integral body,
wherein each unit pattern of the plurality of unit patterns includes a pattern electrode and an aperture, wherein the pattern electrode is disposed adjacent to a boundary of the unit pattern and the aperture is disposed inside the pattern electrode,
and wherein the second electrode includes at least one first counter pattern, and the first counter pattern includes a first counter pattern electrode, which is disposed adjacent to a boundary of the first counter pattern, and a first counter aperture disposed inside the first counter pattern electrode, the first counter aperture being smaller than the aperture inside the pattern electrode.

\* \* \* \* \*